United States Patent
Yang et al.

(10) Patent No.: US 9,594,476 B2
(45) Date of Patent: Mar. 14, 2017

(54) ELECTRONIC DEVICE COMPRISING A TOUCH-SCREEN DISPLAY AND A REAR INPUT UNIT, AND METHOD OF CONTROLLING THE SAME

(71) Applicant: LG Electronics Inc., Seoul (KR)

(72) Inventors: Yoon Seok Yang, Seoul (KR); Ji Yeon Kim, Seoul (KR); Kyungjin Moon, Seoul (KR); Songyi Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 14/316,204

(22) Filed: Jun. 26, 2014

(65) Prior Publication Data
US 2015/0185983 A1    Jul. 2, 2015

(30) Foreign Application Priority Data
Dec. 27, 2013    (KR) .................. 10-2013-0165932

(51) Int. Cl.
| | | |
|---|---|---|
| *G06F 3/0483* | (2013.01) | |
| *G06F 3/0488* | (2013.01) | |
| *G06F 3/023* | (2006.01) | |
| *G06F 3/0354* | (2013.01) | |
| *G06F 3/038* | (2013.01) | |
| *G06F 3/041* | (2006.01) | |
| *G06F 3/0482* | (2013.01) | |
| *G06F 3/0484* | (2013.01) | |
| *G06F 3/0486* | (2013.01) | |

(52) U.S. Cl.
CPC .......... *G06F 3/0483* (2013.01); *G06F 3/023* (2013.01); *G06F 3/038* (2013.01); *G06F 3/03547* (2013.01); *G06F 3/0412* (2013.01); *G06F 3/0416* (2013.01); *G06F 3/0482* (2013.01); *G06F 3/0486* (2013.01); *G06F 3/0488* (2013.01); *G06F 3/04842* (2013.01); *G06F 3/04883* (2013.01); *G06F 2203/0381* (2013.01)

(58) Field of Classification Search
CPC .... G06F 3/0483; G06F 3/023; G06F 3/03547; G06F 3/0412; G06F 3/0416; G06F 3/0482; G06F 3/04842; G06F 3/0486; G06F 3/0488; G06F 3/04883; G06F 2203/0381
See application file for complete search history.

(56) References Cited

U.S. PATENT DOCUMENTS

| | | | |
|---|---|---|---|
| 2010/0056220 A1* | 3/2010 | Oh | G06F 1/1616 455/566 |
| 2010/0107046 A1 | 4/2010 | Kang et al. | |
| 2010/0188353 A1 | 7/2010 | Yoon et al. | |

(Continued)

OTHER PUBLICATIONS

European Search Report issued in Application No. 14002210.4 dated Mar. 13, 2015.

*Primary Examiner* — Temesghen Ghebretinsae
*Assistant Examiner* — Lisa Landis
(74) *Attorney, Agent, or Firm* — KED & Associates LLP

(57) ABSTRACT

The present invention relates to an electronic device and a method of controlling the same. An electronic device according to an embodiment of the present invention converts the state of a page displayed on a touchscreen to a standby state through rear input and cancels the standby state upon release of the rear input, thereby providing a page corresponding to a desired time when the rear input is released.

20 Claims, 49 Drawing Sheets

(56) References Cited

U.S. PATENT DOCUMENTS

2013/0063385 A1    3/2013   Nishio
2013/0141362 A1    6/2013   Asanuma
2013/0321340 A1*  12/2013   Seo ..................... G06F 1/1641
                                                            345/174

* cited by examiner (Touch release according to F1)

ELECTRONIC DEVICE COMPRISING A TOUCH-SCREEN DISPLAY AND A REAR INPUT UNIT, AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Patent Application No. 10-2013-0165932, filed on 27 Dec. 2013, the contents of which are incorporated by reference herein in their entirety.

BACKGROUND

1. Field

The present invention relates to an electronic device and a method of controlling the electronic device.

2. Background

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

As a terminal is widely used, user's demands for easy edition of displayed objects increase.

As functions of mobile terminals diversify, the mobile terminals are implemented as multimedia players having complicated functions of capturing pictures or moving images, playing music, video files and games and receiving broadcast programs.

To implement complicated functions of multimedia players, various new attempts are applied in terms of hardware or software. For example, a user interface environment in which a user searches for or selects a function easily and conveniently is provided.

In addition, as a user regards a mobile terminal as a personal item reflecting their personality, various designs are required. Mobile terminal design includes structural changes and modifications that allow the mobile terminal to be used more conveniently. A user input unit may be considered as a structural change and modification.

For example, the user input unit is provided to the front of the mobile terminal as a touchscreen or implemented as a key separately provided to the mobile terminal to receive user input. However, the touchscreen has shortcomings that an operation object is covered by a user's finger or a stylus. To correct the shortcomings, an additional key is provided to the front or side of the main body of the mobile terminal. However, the key hinders slim structure, simple design, etc. of the mobile terminal. Therefore, a user input unit in a new structure capable of solving the aforementioned problems may be considered.

SUMMARY

An object of the present invention is to provide an electronic device and a method of controlling the same to efficiently use various functions that can be implemented through the electronic device by means of user input in a new form.

Another object of the present invention is to provide an electronic device and a method of controlling the same for solving inconveniences caused by restricted conventional input means by extending input of the electronic device to rear input and combining the rear input and input applied to a touchscreen corresponding to the front side of the electronic device.

The technical problems solved by the present invention are not limited to the above technical problems and those skilled in the art may understand other technical problems from the following description. According to one aspect of the present invention, there is provided an electronic device, including: a body; a touchscreen provided to the front side of the body; a rear input unit provided to the backside of the body and configured to receive control commands; and a controller configured to store a first page in a standby state when a first input is received through the rear input unit while the first page is displayed on the touchscreen, to execute a function corresponding to a second input applied to the touchscreen while the standby state of the first page is maintained when the second input is received while the first input is maintained and to display the first page in the standby state on the touchscreen upon release of the first input.

The controller may display a first thumbnail corresponding to the first page on the touchscreen in response to the first input.

The second input may include input for changing the page displayed on the touchscreen, and the controller may display a second thumbnail corresponding to the second page along with the first thumbnail on the touchscreen when a predetermined input is received while the second page is displayed on the touchscreen in response to the second input.

The predetermined input may include at least one of input applied to a soft key displayed on the touchscreen, input applied to a hard key provided to the body, and touch input applied to the rear input unit when the rear input unit is a touch panel, the touch input being discriminated from the first input.

The controller may delete the first thumbnail displayed on the touchscreen upon release of the first input.

When a plurality of pages is stored in the standby state in response to the first input, the controller may display a plurality of thumbnails respectively corresponding to the pages through a thumbnail tray on the touchscreen.

The controller may control display of a page corresponding to a thumbnail included in the thumbnail tray according to a touch pattern applied to the thumbnail.

The first page may include at least one of a webpage and a page for editing an image.

The second input may include drag input applied to a submenu corresponding to the first page, and the controller may display a new layer in a sliding manner in response to the drag input while display of the first page is maintained and displays information related to the submenu on the layer.

The submenu may include menus configured in the form of a menu tree having a predetermined depth relation.

The second input may include a predetermined input with respect to one of a plurality of components of the first page, and the controller may separate the selected component from the first page and display the separated component as a floating window movable over the entire area of the touchscreen.

The first input may include a touch-and-drag input applied to the rear input unit, the first page may be flipped and thus the back of the first page may be displayed on the touchscreen in response to the first input, and handwriting input may be received through the back of the first page.

A handwriting input region through which the handwriting input is received may be smaller than the first page.

The handwriting input region may be processed into a transparent region such that the first page is projected therethrough.

An indicator indicating presence of a predetermined note in the first page may be displayed upon completion of handwriting input.

The first page may include a preview image captured through a camera, the second input may include an input for capturing an image, and the controller may display a thumbnail corresponding to an image captured in response to the second input on the preview image.

Two thumbnails displayed on the preview image may be sequentially selected and images respectively corresponding to the thumbnails may be combined and provided.

An electronic device according to another aspect of the present invention includes: a body; a touchscreen provided to the front side of the body; a rear input unit provided to the backside of the body and configured to receive control commands; and a controller configured to display a layer having a size varied according to a first input on the touchscreen while a page including at least one item is displayed on the touchscreen when the first input is received through the rear input unit while the page is displayed on the touchscreen and to display at least one item selected from the at least one item included in the page on the layer when a second input for selecting at least one of the at least one item is received while the first input is maintained.

A method of controlling an electronic device according to another aspect of the present invention includes: displaying a first page on a touchscreen provided to the front side of the body of the electronic device; receiving a first input through a rear input unit provided to the backside of the body and configured to receive control commands; storing the first page in a standby state in response to the first input; executing a function corresponding to a second input applied to the touchscreen while the standby state of the first page is maintained when the second input is received while the first input is maintained; and displaying the first page in the standby state on the touchscreen upon release of the first input.

The first page may include at least one of a webpage, a preview image according to execution of a camera application, an image editing screen, at least one image and a content playlist.

The first input may include at least one of touch input applied to the rear input unit, touch-and-drag input and multi-touch input.

The storing of the first page in the standby state may include displaying a thumbnail corresponding to the first page on the touchscreen.

The electronic device and the method of controlling the same according to the present invention have the following advantages.

Various functions which can be implemented through the electronic device can be used more efficiently through user input in a new form.

In addition, input to the electronic device can be extended to rear input applied to the backside of the electronic device, and thus rear input and touchscreen input can be combined to solve inconvenience caused by restricted conventional input means.

BRIEF DESCRIPTION OF THE DRAWINGS

The embodiments will be described in detail with reference to the following drawings in which like reference numerals refer to like elements wherein.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

An electronic device may be described below with reference to the accompanying drawings. In the following description, suffixes "module" and "unit" may be given to components of the electronic device in consideration of only facilitation of description and do not have meanings or functions discriminated from each other.

The electronic device may include a cellular phone, a smart phone, a laptop computer, a digital broadcasting terminal, personal digital assistants (PDA), a portable multimedia player (PMP), a navigation system and/or so on.

Figure 1:
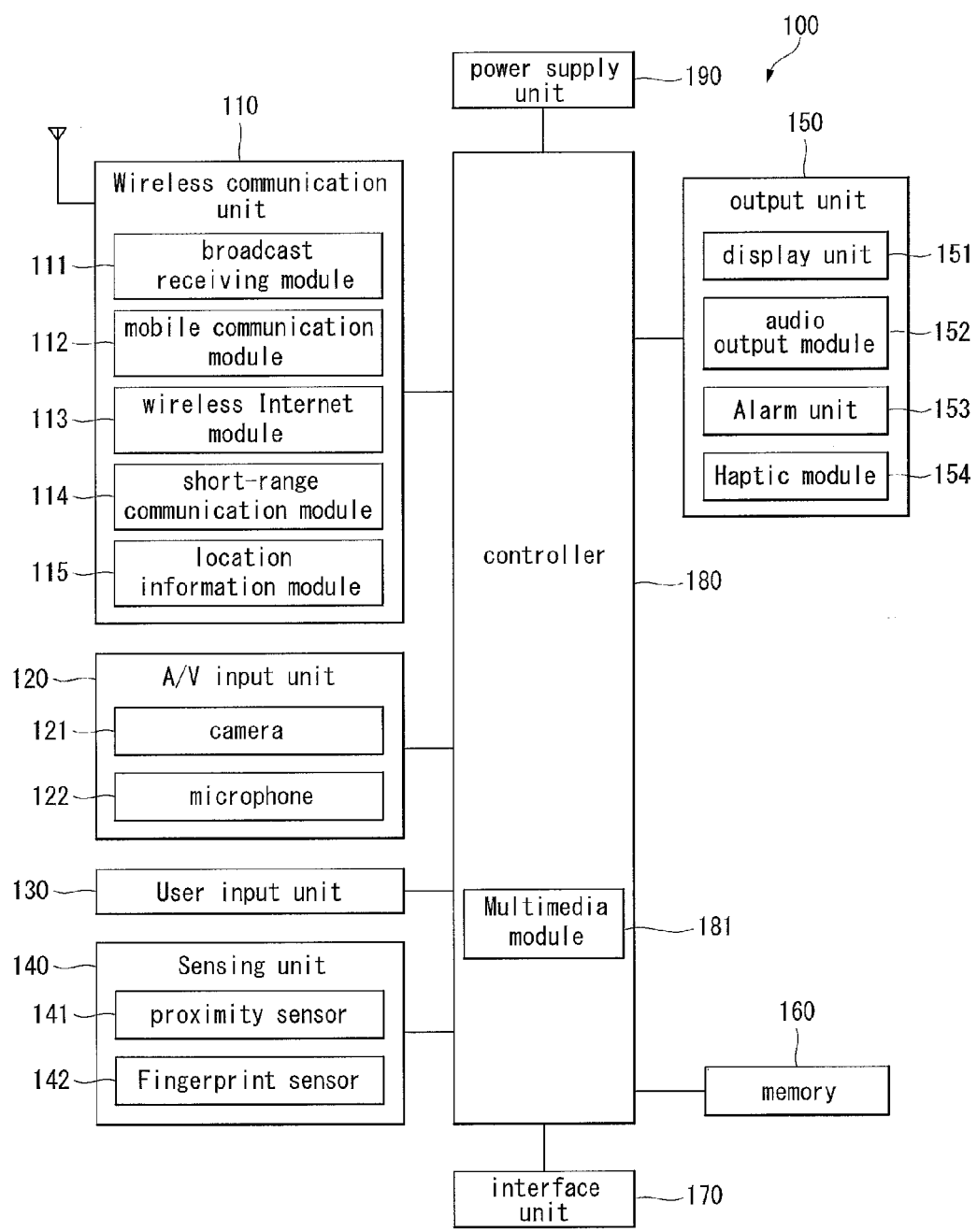
FIG. 1 is a block diagram of an electronic device according to an embodiment.

FIG. 1 is a block diagram of an electronic device according to an embodiment. Other embodiments, configurations and arrangements may also be provided.

As shown, the electronic device 100 may include a wireless communication unit 110 (or radio communication unit), an audio/video (NV) input unit 120, a user input unit 130, a sensing unit 140, an output unit 150, a memory 160, an interface 170, a controller 180, and a power supply 190. The components shown in FIG. 1 may be essential parts and/or a number of components included in the electronic device 100 may vary. Components of the electronic device 100 may now be described.

The wireless communication unit 110 may include at least one module that enables radio communication between the electronic device 100 and a radio communication system or between the electronic device 100 and a network in which the electronic device 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal.

The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the electronic device 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The electronic device 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the electronic device 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the electronic device 100 is in the call mode. The display 151 may also display a captured and/or received image, a UI or a GUI when the electronic device 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the electronic device 100 that is occupied by the display 151.

The electronic device 100 may also include at least two displays 151. For example, the electronic device 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The electronic device 100 may include a fingerprint sensor 142 for sensing a fingerprint for user authentication. The fingerprint sensor 142 generates fingerprint recognition information from a signal of a fingerprint recognition electrode. The fingerprint sensor 142 may or may not include the fingerprint recognition electrode.

The fingerprint sensor 142 according to one embodiment may be implemented as a slide type sensor. The slide type fingerprint sensor 142 can sense the fingerprint of a sliding finger to read fragmentary fingerprint images and combine the fragmentary fingerprint images into one image through image registration to generate a full fingerprint image.

The fingerprint sensor 142 may include an additional recognition window. When a user puts a finger on the recognition window and slides the finger at a predetermined velocity, the fingerprint of the finger can be scanned and fragmentary fingerprint images can be acquired. The slide type fingerprint sensor may be referred to as a bar type or linear fingerprint sensor according to the shape of the recognition window.

The recognition window of the fingerprint sensor 142 may be provided to the backside of the electronic device 100.

The fingerprint sensor 142 may be integrated with a touch panel of the touchscreen 151 such that a fingerprint sensing layer overlaps with at least part of the touch panel.

Accordingly, the electronic device according to an embodiment of the present invention may receive fingerprint input applied to the recognition window for fingerprint sensing or sense fingerprint input through touch input in a predetermined pattern, applied to the touchscreen in a fingerprint input mode.

The fingerprint sensor 142 may be integrated with a fingerprint input module 133a shown in FIG. 2b, which will be described later, in a package.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The electronic device 100 may also include a plurality of haptic modules 154.

The memory 160 may store a program for operations of the controller 180 and/or temporarily store input/output data such as a phonebook, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The electronic device 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the electronic device 100 or transmit data of the electronic device 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the electronic device 100 through a port of the interface 170.

The interface 170 may also be a path through which power from an external cradle is provided to the electronic device 100 when the electronic device 100 is connected to the external cradle or a path through which various command signals input by the user through the cradle are transmitted to the mobile terminal 100. The various command signals or power input from the cradle may be used as signals for confirming whether the electronic device 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the electronic device 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2:
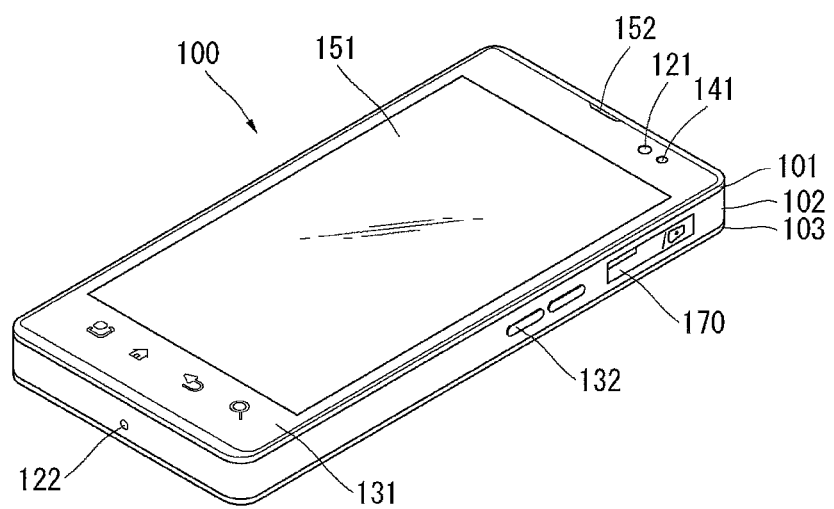
FIG. 2 is a front perspective view of a mobile terminal related to the present invention.

FIG. 2 is a front perspective view of a mobile terminal related to the present invention.

The electronic device 100 includes a bar type body. However, the present invention is not limited thereto and is applicable to various types such as slide type, folder type, swing type, swivel type, etc.

The body includes a case (casing, housing, cover, etc.) that forms the exterior of the mobile terminal. In the present embodiment, the case may be divided into a front case 101, a rear case 102 and a battery cover 103. Electronic components are arranged in a space between the front case 101 and the rear case 102. At least one middle case may be additionally arranged between the front case 101 and the rear case 102.

The cases may be formed through plastic injection or may be made of a metal, for example, stainless steel (STS) or titanium (Ti).

The display 151, the audio output module 152, the proximity sensor 141, the camera 121, the user input unit 130, etc. may be arranged in the terminal body, mostly in the front case 101.

The display 151 occupies the main part of the front case 101. The audio output module 152, the camera 121 and the proximity sensor 141 are located in a region adjacent to one edge of the display 151 and a front input unit 131 and the microphone 122 are arranged in a region adjacent to the other edge of the display 151.

The front input unit 131 is an example of the user input unit 130 (refer to FIG. 1) and may include a plurality of manipulation units 131 and 132. The manipulation units 131 and 132 may be referred to as a manipulating portion and may be implemented in a tactile manner. The front input unit 131 is configured in the form of a touch key in the present embodiment. However, the present invention is not limited thereto and a push key may be added to the front input unit 131.

Various inputs to the manipulation units 131 and 132 may be set. For example, commands such as "start", "end", "scroll", etc. may be input through the first manipulation unit 131 and a command for controlling the volume of sound output from the audio output module 152 or a command for converting the mode of the display 151 into a touch recognition mode may be input through the second manipulation unit 32.

The manipulation unit 131 may be provided in the form of a button and may be used as an interface for receiving a fingerprint of the user. For example, the manipulation unit 131 may acquire fingerprint information of the user in a capacitive manner.

Alternatively, the manipulation unit 131 may acquire the fingerprint information of the user in a light detection manner through a fingerprint input window provided to a predetermined area.

In addition, the display 151 may form a touchscreen with a touch sensor. In this case, the touchscreen can correspond to the user input unit 130. This configuration enables the front input unit 131 to be omitted from the mobile terminal. Here, the mobile terminal 100 may be configured such that input manipulation for the terminal body can be applied only through the display 151 and a rear input module 133 which will be descried later.

Figure 3A:
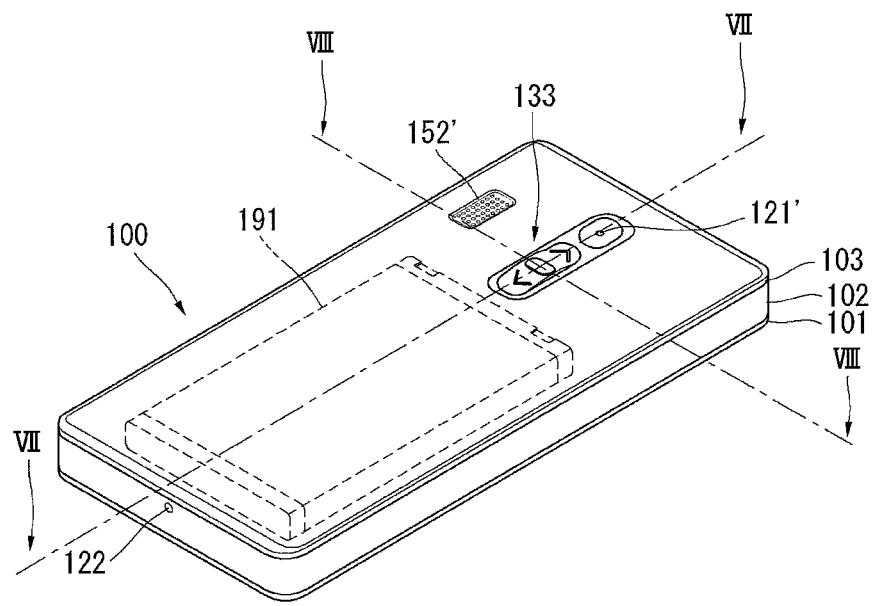
FIGS. 3a and 3b are rear perspective views of the mobile terminal shown in FIG. 2.

Referring to FIG. 3a, a camera module 121' may be additionally provided to the backside of the terminal body, that is, the rear case 102. The camera module 121' may be a camera having a photographing direction opposite to that of the camera 121 (refer to FIG. 2) and including pixels different from those of the camera 121.

For example, the front camera module 121 preferably has low pixels for taking a picture of a user face and transmitting the picture in case of video telephony, whereas the rear camera module 121' preferably has high pixels since the rear camera module 121' captures an image of an object and does not immediately transmit the captured image in many cases. The camera modules 121 and 121' may be installed in the terminal body in such a manner that the camera modules 121 and 121' can be rotated or popped up.

A flash bulb 123 and a mirror (not shown) may be additionally provided in proximity to the camera module 121'. The flash bulb 123 flashes light at an object when the camera module 121' captures an image of the object. The mirror is used for the user to see the face when the user attempts to photograph (self-photograph) themselves using the camera module 121'.

An audio output module 152' may be additionally provided to the backside of the terminal body. The rear audio output module 152' may implement a stereo function with the front audio output module 152 (Refer to FIG. 2) and may be used to implement a speaker phone mode when the user makes a call using the mobile terminal 100.

A battery 191 for supplying power to the mobile terminal 100 is set in the terminal body. The battery 191 is configured as an example of the power supply 190. The battery 191 may be built in the terminal body or detachably attached to the terminal body.

Referring to FIG. 3a, the rear input module 133 is provided to the backside of the terminal body. The rear input module 133 is configured as an example of the user input unit 130 (refer to FIG. 1). The rear input module 133 may be located adjacent to the camera module 121' exposed from the backside of the terminal body.

The rear input module 122 is manipulated to receive commands for controlling operations of the mobile terminal 100. Various inputs may be applied to the rear input module 133. For example, commands such as "power on/off", "start", "end", "scroll", etc., a command for controlling the volume of sound output from the audio output modules 152 and 152' and a command for switching the mode of the display 151 to a touch recognition mode can be input to the rear input module 133.

The functional modules provided to the backside of the terminal body according to an embodiment of the present invention may be modified or combined in various manners. For example, the fingerprint input window 133 and the rear input module (not shown) can be integrated into one module and implemented as a multi-function input window capable of switching between a fingerprint recognition mode and a user input reception mode can be implemented.

Since the rear input module (not shown) is provided to the backside of the terminal body, a new user interface using the rear input module may be implemented. In addition, the fingerprint input window 133 and/or the rear input module (not shown) provided to the backside of the terminal body may replace at least some functions of the front input unit 131 such that the display 151 can be configured having a large screen when the front input unit 131 is not provided to the front side of the terminal body.

Figure 3B:
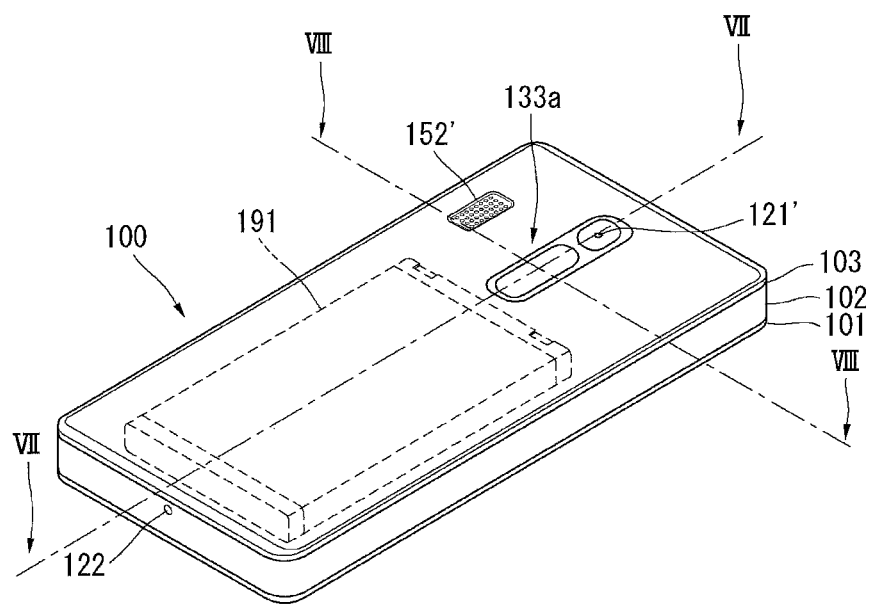

While the backside of the terminal body can be provided as a hard key type panel, such as the rear input module 133 shown in FIG. 3b, the backside of the terminal body may be provided as a touch panel 133a having a predetermined size.

Accordingly, display of display 151 can be controlled through touch input of the user, applied to the touch panel 133a provided to the backside of the terminal body. In addition, it is possible to control display of the display 151 by recognizing only touch input in a predetermined pattern through the touch panel 133a provided to the backside of the terminal body due to size restriction of the touch panel 133a. For example, the touch input in the predetermined pattern can include single touch input, multi-touch input or drag input.

Furthermore, the touch panel 133a may execute the function of the fingerprint input window for recognizing the fingerprint of the user. In this case, the touch panel 133a may be packaged with the fingerprint sensor.

The touch panel 133a may be arranged at a position where the touch panel 133a can scan the fingerprint of the forefinger of the user while the user grips the electronic device 100. However, the present invention is not limited thereto and the position of the touch panel 133a can be changed.

The fingerprint of the user may be recognized through input applied to the rear input module 133 shown in FIG. 3a.

The functional modules provided to the backside of the terminal body according to an embodiment of the present invention may be modified or combined in various manners. For example, the rear input module (133 of FIG. 3a) and the touch panel (133a of FIG. 3b) can be integrated into one module.

When only one of the rear input module (133 of FIG. 3a) and the touch panel (133a of FIG. b) is used, such module may be implemented as a multi-function input means capable of switching between a fingerprint recognition mode and a user input reception mode.

Since the rear input module (133 of FIG. 3a) and the touch panel 133b) are provided to the backside of the terminal body, a new user interface using the rear input module and the touch panel may be implemented. In addition, the rear input module (133 of FIG. 3a) and/or the touch panel 133a provided to the backside of the terminal body may replace at least some functions of the front input unit 131 such that the display 151 can be configured having a large screen when the front input unit 131 is not provided to the front side of the terminal body.

A description will be given of embodiments of the present invention. It is assumed that the display 151 is a touchscreen 151 for convenience of description. As described above, the touchscreen 151 can execute both the information display function and information input function. However, the present invention is not limited thereto. In addition, touch described in the specification may include both contact touch and proximity touch.

In the following description, user input for fingerprint recognition, which is applied to the backside of the terminal body, can be processed through at least one of the rear input module 133 of FIG. 3a and the touch panel 133a of FIG. 3b.

Figure 4:
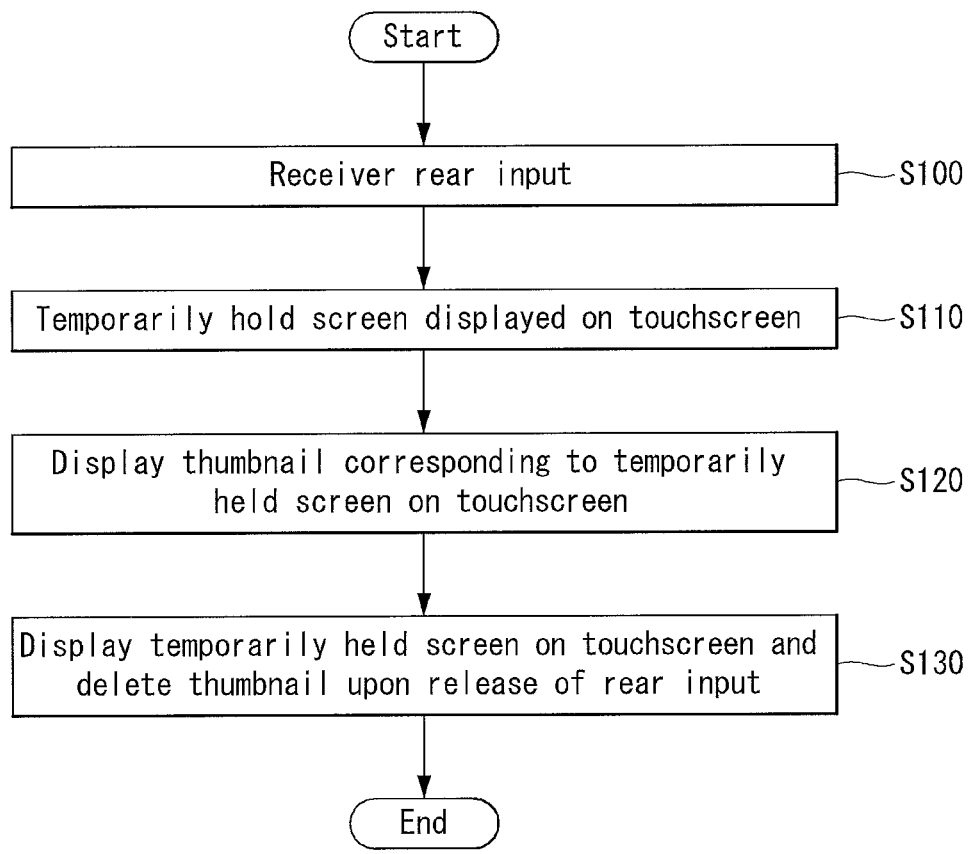
FIG. 4 is a flowchart illustrating a method of controlling an electronic device for explaining the concept of the present invention.

FIG. 4 is a flowchart illustrating a method of controlling an electronic device for explaining the concept of the present invention and FIGS. 5a to 5d show exemplary screens of the electronic devices for explaining the method shown in FIG. 4 in more detail.

The method of controlling an electronic device according to an embodiment of the present invention may be implemented in the electronic device 100 described with reference to FIGS. 1, 2 and 3. A description will be given of the method of controlling the electronic device according to an embodiment of the present invention and operations of the electronic device 100 with reference to the attached drawings.

Referring to FIG. 4, the controller 180 receives rear input through the rear input unit (133a of FIG. 3b) (S100).

The rear input may be received while a predetermined image is displayed on the touchscreen 151. The predetermined image may be an application execution screen.

Figure 5A:
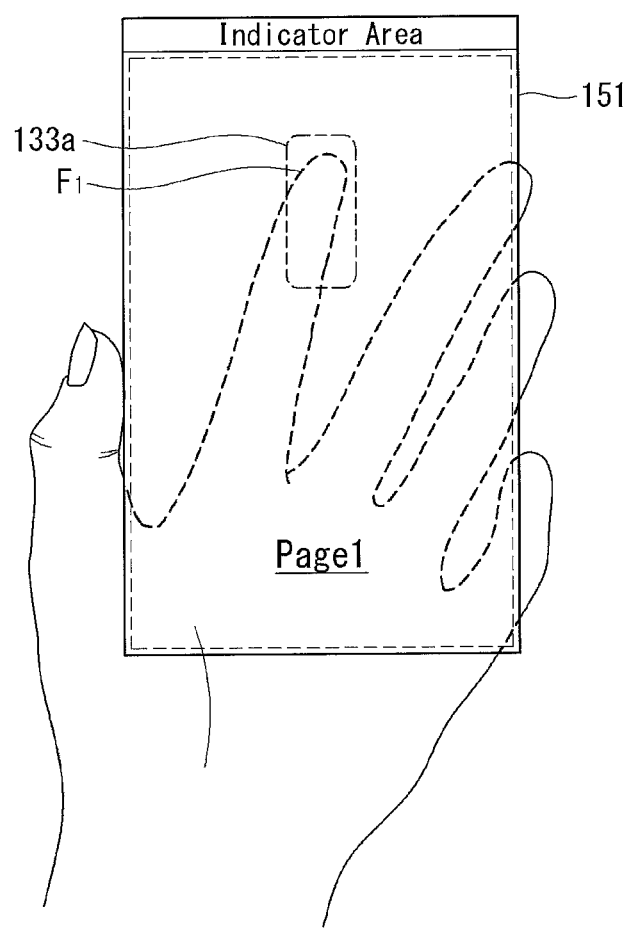
FIGS. 5a to 5d show exemplary screens of an electronic device for explaining the method shown in FIG. 4.

Referring to FIG. 5a, rear input can be applied by a first finger F1 of the user to the rear input unit (133a of FIG. 3b) while the application execution screen (page 1) is displayed on the touchscreen 151.

Upon reception of the rear input, the controller 180 can control the screen displayed on the touchscreen 151 to be temporarily held (S110).

Here, temporary holding of the screen displayed on the touchscreen 151 may be recognized as holding the screen displayed on the touchscreen 151 at the back of the mobile terminal as the rear input is received. Furthermore, temporary holding of the screen may refer to temporary storing of the screen such that the held screen can be displayed again on the touchscreen 151 after additional input is applied to the touchscreen 151.

The controller 180 may display a thumbnail of the temporarily held screen on the touchscreen 151.

Figure 5B:
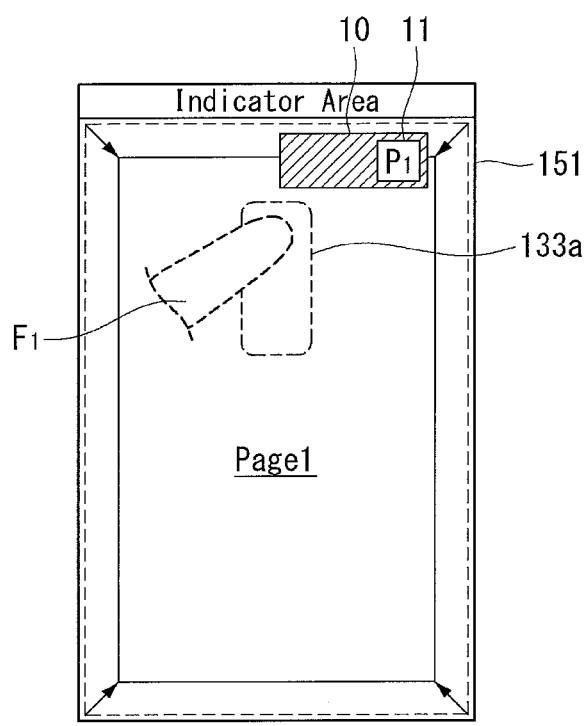

Referring to FIG. 5b, the page Page1 displayed on the front side of the touchscreen 151 may be temporarily stored according to the rear input F1 and a thumbnail P1 of the page may be displayed on the touchscreen 151.

The controller 180 may provide a predetermined animation effect to the page Page1 displayed on the touchscreen 151 according to the rear input F1. For example, effect of temporarily reducing the size of the page Page1 and dragging the same to the backside of the terminal can be applied.

Simultaneously, the controller 180 may display a thumbnail tray 10 including the thumbnail P1 of the page Page1.

The thumbnail tray 10 may be displayed on a predetermined region of the touchscreen 151, such as the top or bottom of the right side of the touchscreen 151.

In addition, the thumbnail tray 10 may include thumbnails with respect to a plurality of pages held according to the rear input F1. Addition of thumbnails will be described later.

The controller 180 may receive predetermined touch input applied to the touchscreen 151 while the rear input F1 is maintained and execute a function corresponding to the predetermined touch input.

Figure 5C:
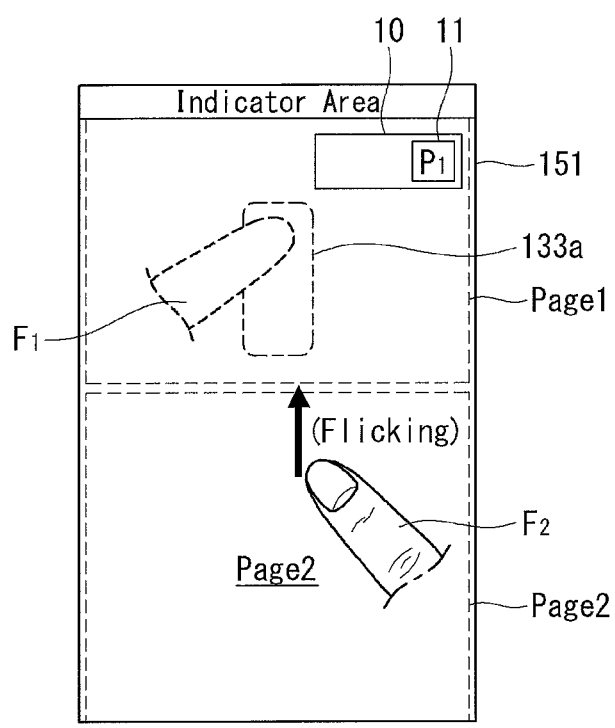

Referring to FIG. 5c, the holding state of the first page Page1 is maintained when the rear input F1 is maintained. However, the controller 180 can execute a function corresponding to touch input applied to the touchscreen 151 even if the first page holding state is maintained. Accordingly, when touch input of flicking the touchscreen 151 upward is received, a second page Page2 may be displayed on the touchscreen 151.

When the rear input is released, the controller 180 may re-display the temporarily held page on the touchscreen 151 and delete the thumbnail indicating the temporary holding state (S130).

Figure 5D:
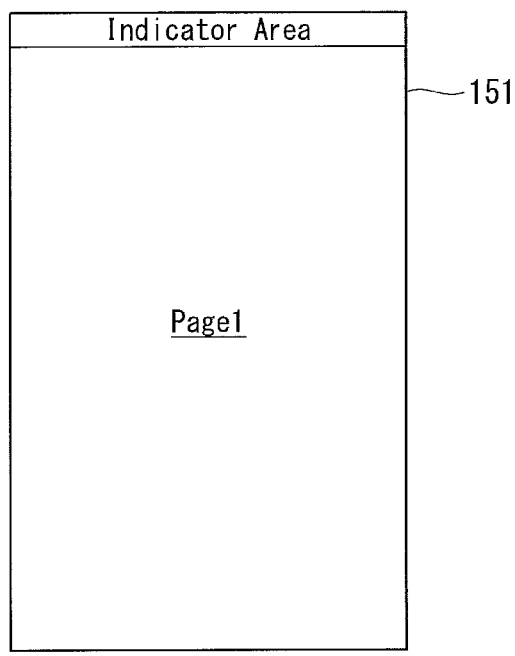

Referring to FIG. 5d, when the rear input F1 is released in FIG. 5c, the page Page1 temporarily held according to the rear input F1 can be displayed on the touchscreen 151.

An image in which the user is interested from among images provided through the front touchscreen 151 of the electronic device 100 can be temporarily held according to rear input, other images can be searched through the touchscreen 151, and the held image can be re-displayed on the touchscreen by releasing the rear input.

Therefore, it is possible to achieve the function corresponding to the conventional bookmark function through simple rear input.

A description will be given of various embodiments that can be implemented through the electronic device 100 by using input units including not only the touchscreen 151 corresponding to the front side of the electronic device but also the rear input unit.

Figure 6:
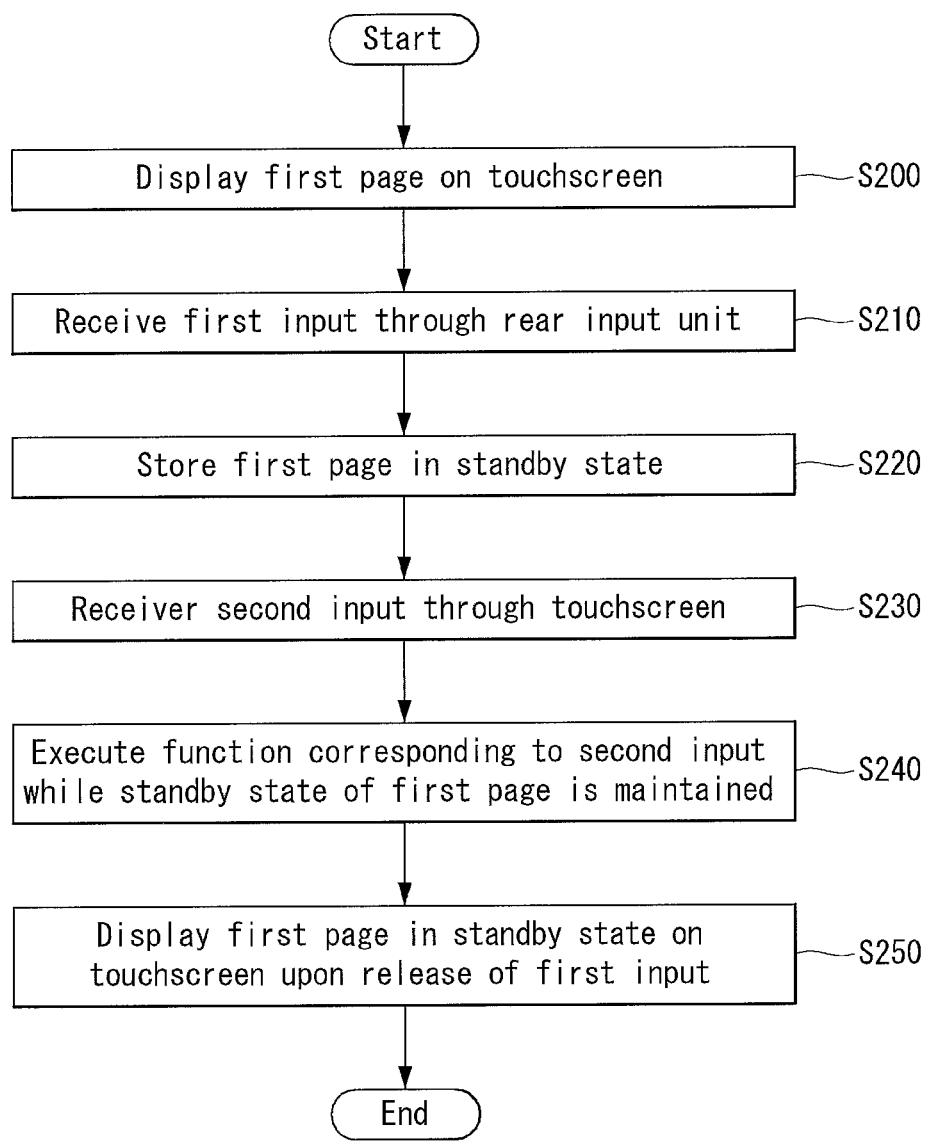
FIG. 6 is a flowchart illustrating a method of controlling an electronic device according to a first embodiment of the present invention.

FIG. 6 is a flowchart illustrating a method of controlling an electronic device according to a first embodiment of the present invention.

The method of controlling an electronic device according to the first embodiment of the present invention may be implemented in the electronic device 100 described with reference to FIGS. 1, 2 and 3. The method of controlling the electronic device according to the first embodiment of the present invention and operations of the electronic device 100 will now be described in detail with reference to the attached drawings.

Referring to FIG. 6, the controller 180 may display a first page on the touchscreen 151 (S200).

The first page may include at least one of a webpage, a preview image according to execution of a camera application, an image editing screen and at least one image and content playlist. Embodiments in which the first embodiment of the present invention is applied to the images corresponding to the first page will be described later.

The controller 180 may receive a first input through the rear input unit while the first page is displayed on the touchscreen 151 (S210).

The first input may include at least one of touch input applied to the rear input unit, touch-and-drag input and multi-touch input. The first input may be applied in various patterns since the rear input unit can be provided in the form of a soft key, hard key or touch panel, as described above.

The controller 180 may store the first page displayed on the touchscreen 151 in a standby state in response to the first input (S220).

Here, storing the first page in the standby state means holding the first page according to the first input applied through the rear input unit. When the first input is released, the held first page may be re-displayed on the touchscreen 151 as if the first page is returned to the touchscreen 151 according to resilience.

When the first page is stored in the standby state, attributes of the first page are stored with the first page. When the first page is re-displayed on the touchscreen 151 as the first input is released, the first page may be displayed with the attributes maintained.

The controller 180 may receive a second input applied to the touchscreen 151 (S230). The second input is touch input for manipulating the first page displayed on the touchscreen 151 and may include single touch input, double touch input, long touch input, flicking input, etc. The second input applied to the touchscreen 151 is received while the first input applied to the rear input unit is maintained.

Accordingly, the user can store a desired page in the standby state through rear input at any time by maintaining the rear input with one hand and controlling the touchscreen 151 with the other hand.

The controller 180 may execute a function corresponding to the second input while the first page is maintained in the standby state (S240).

The function corresponding to the second input will be described in detail below.

The controller 180 may re-display the first page in the standby state on the touchscreen 151 upon release of the first input applied to the rear input unit (S250).

FIGS. 7a to 7e illustrate the method of controlling an electronic device according to the first embodiment of the present invention.

Figure 7A:
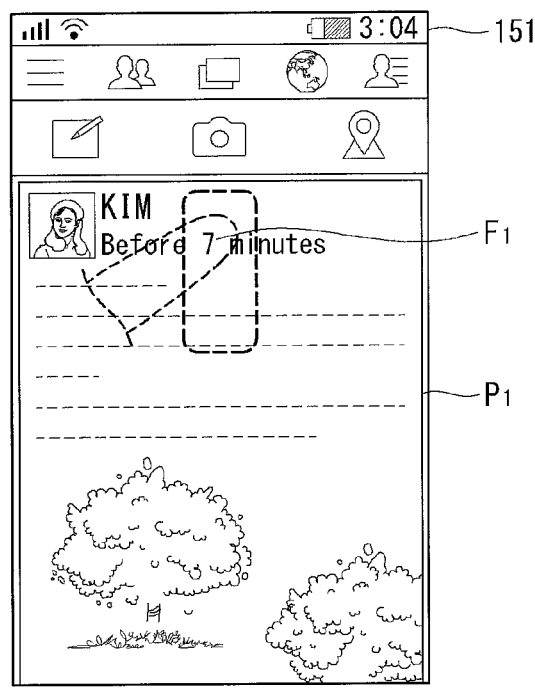
FIGS. 7a to 7e are views for explaining the method of controlling an electronic device according to the first embodiment of the present invention.

Referring to FIG. 7a, the controller 180 may display the first page P1 on the touchscreen 151. The first page P1 may include a predetermined webpage, an SNS page, etc.

Figure 7B:
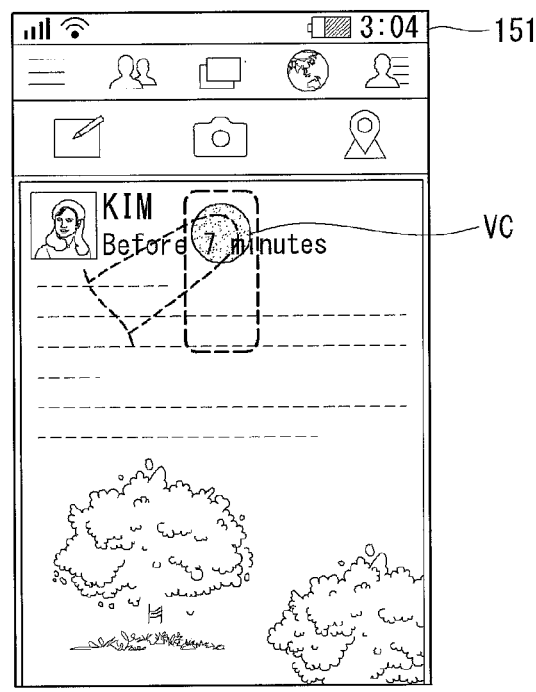

When rear input F1 is received through the rear input unit (133a of FIG. 3b) while the first page P1 is displayed on the touchscreen 151, a virtual rear input indicator VC for indicating that the rear input F1 has been received may be displayed on the touchscreen 151, as shown in FIG. 7b.

The transparency of the rear input indicator VC may be controlled such that the rear input indicator VC does not disturb display of text, items, content, etc., which are currently provided through the touchscreen 151.

The rear input indicator VC may be continuously displayed on the touchscreen 151 while the rear input F1 is maintained. In the following description, display of the rear input indicator VC on the touchscreen 151 is regarded as maintenance of the rear input. Accordingly, the rear input may be denoted by VC in the following description for convenience.

Figure 7C:
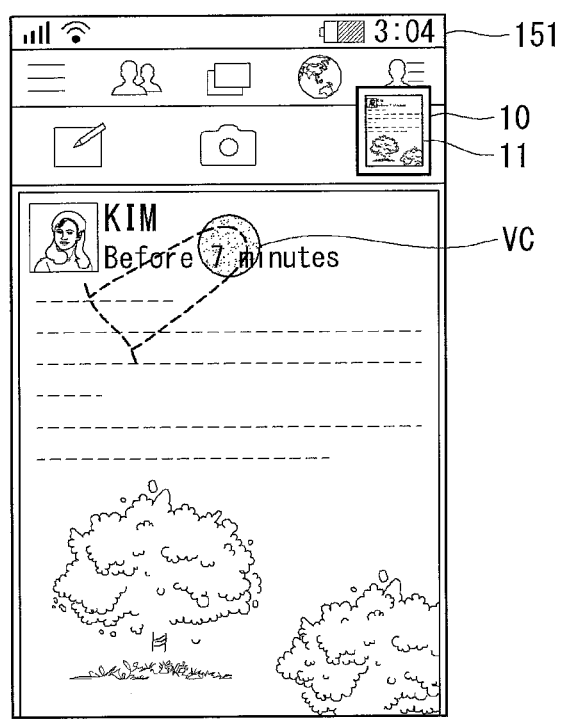

Referring to FIG. 7c, the controller 180 may display a thumbnail 11 of the first page on the touchscreen 151 to indicate that the first page P1 has been stored in the standby state. The thumbnail 11 may be displayed in the thumbnail tray 10.

Figure 7D:
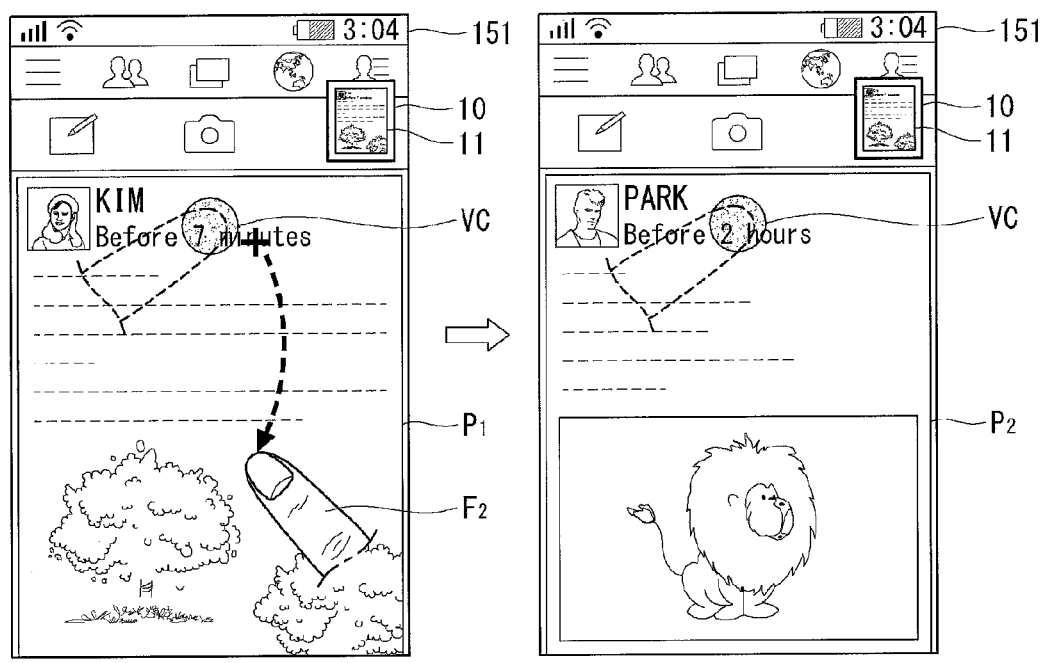

Referring to FIG. 7d, the controller 180 may receive flicking input F2 for moving the first page P1 displayed on the touchscreen 151 downward while the rear input VC is maintained.

The controller 180 may display a second page P2 on the touchscreen 151 in response to the flicking input F2. Even if the second page P2 is displayed on the touchscreen 151, the standby state of the first page P1 is maintained as long as the rear input VC is maintained.

Figure 7E:
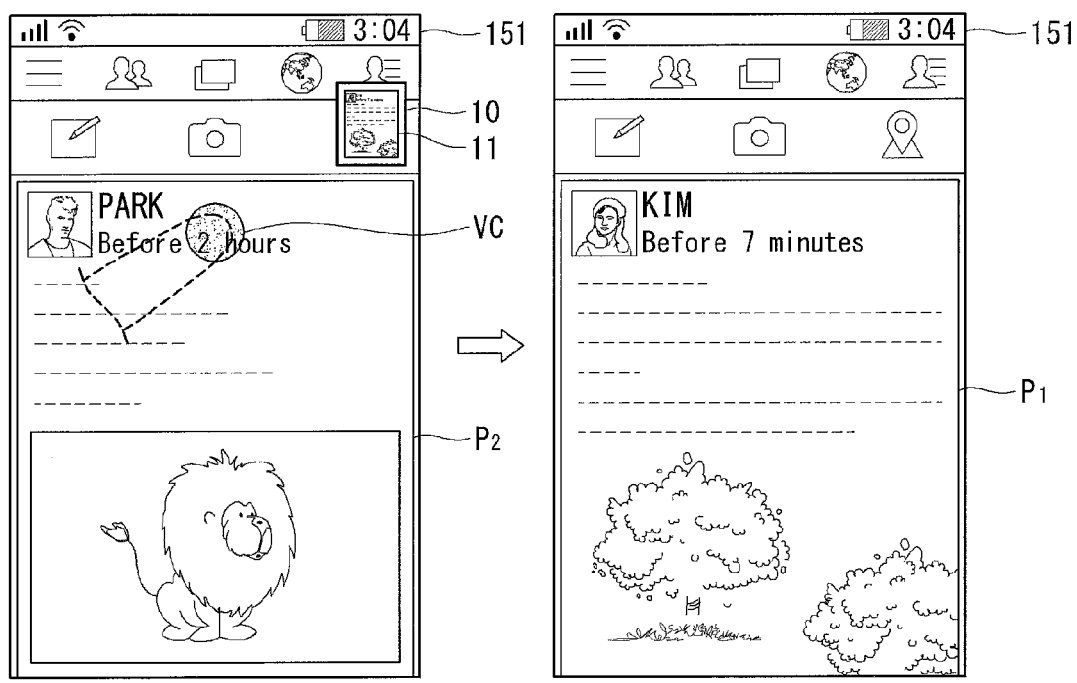

Referring to FIG. 7e, when the rear input is released while the second page P2 is displayed on the touchscreen 151, the controller 180 deletes the virtual rear input indicator VC from the touchscreen 151.

In addition, the controller 180 may delete the thumbnail 11 for indicating the standby state with the rear input indicator VC upon release of the real input.

Accordingly, the user can instantaneously hold a desired page and return the held page as desired by releasing rear input.

While an example of holding one page through one-time rear input has been described, the present invention is not limited thereto. For example, a plurality of pages can be held through rear input.

Figure 8A:
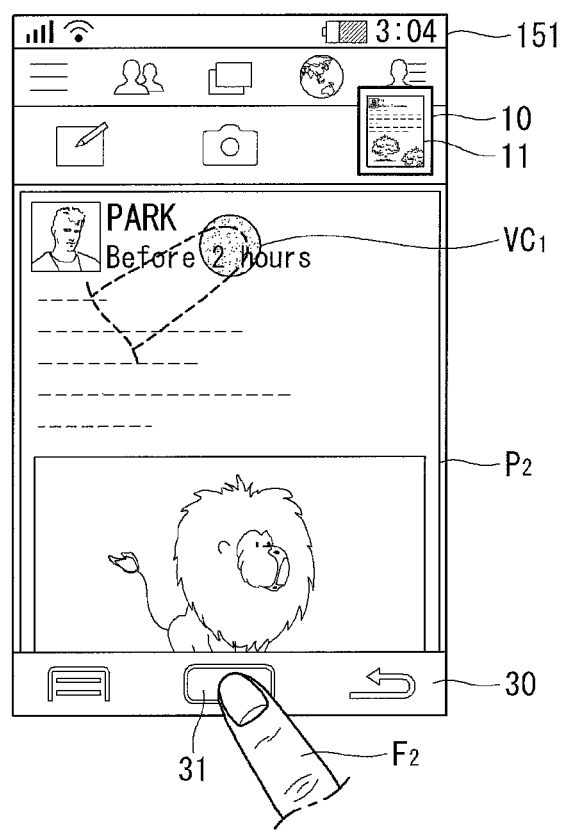
FIGS. 8a and 8b are views for explaining an example of adding a temporarily stored page according to the first embodiment of the present invention.
Figure 8B:
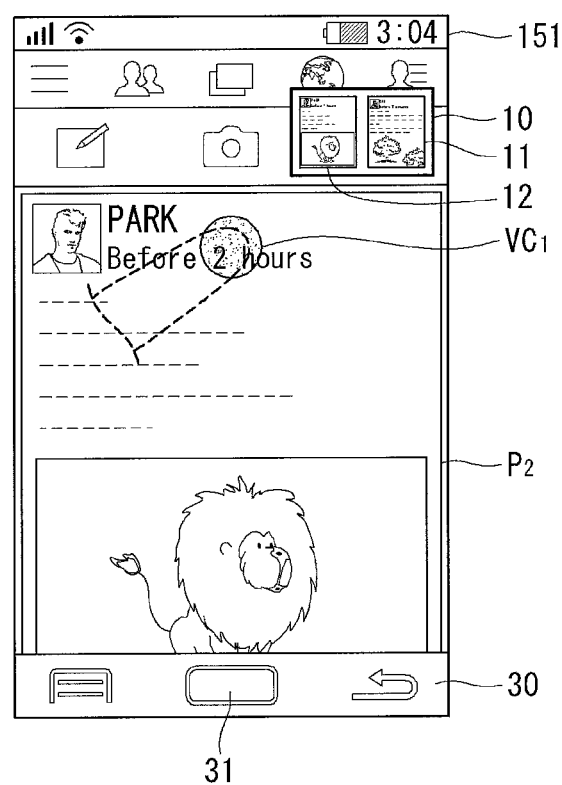

FIGS. 8a and 8b illustrate an example of adding a temporarily stored page according to the first embodiment of the present invention.

Referring to FIG. 8a, the controller 180 may store the first page in the standby state through rear input VC1 and display the second page P2 on the touchscreen 151 by manipulating the touchscreen 151.

Upon input to a home key 31 on a navigation bar 30 provided to the bottom of the touchscreen 151, the controller 180 may store the second page P2 in the standby state like the first page P1. In addition, the controller 180 may display the thumbnail tray 10 including a thumbnail 12 corresponding to the second page P2.

The controller 180 may add a temporarily stored page by combining touch input applied to the rear input unit 133a and touch input applied to the touchscreen 151. That is, the controller 180 may temporarily store the first page P1 through the rear input VC1 and also temporarily store the second page P2 by additionally selecting a predetermined key (e.g. home key 31) provided to the touchscreen 151 while the rear input VC1 is maintained.

Figure 9A:
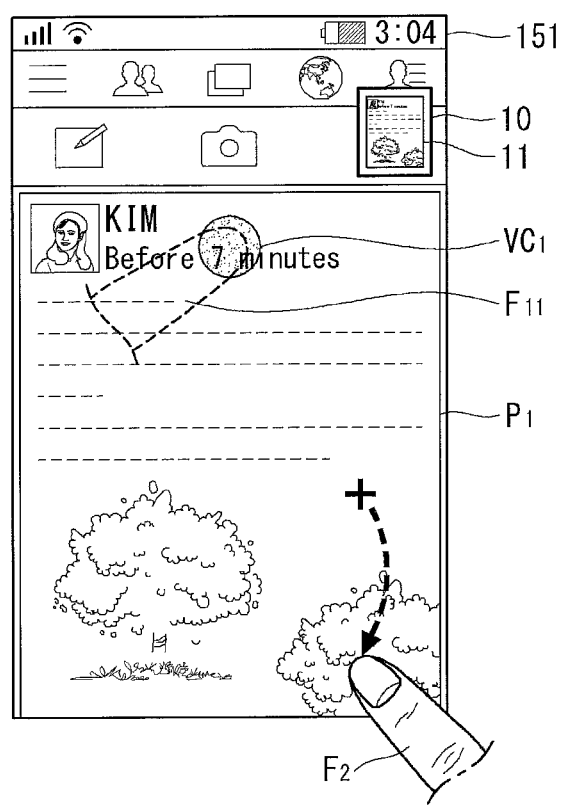
FIGS. 9a, 9b and 9c are views for explaining another example of adding a temporarily stored page according to the first embodiment of the present invention.
Figure 9B:
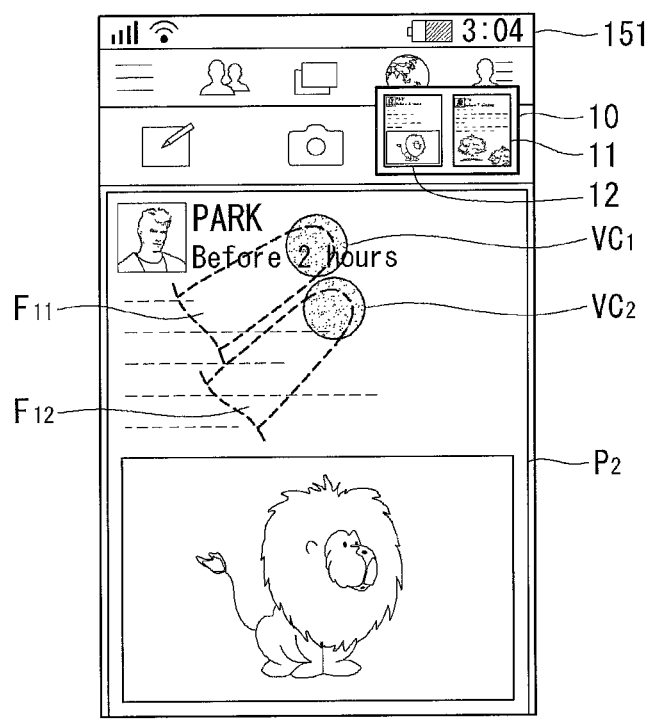
Figure 9C:
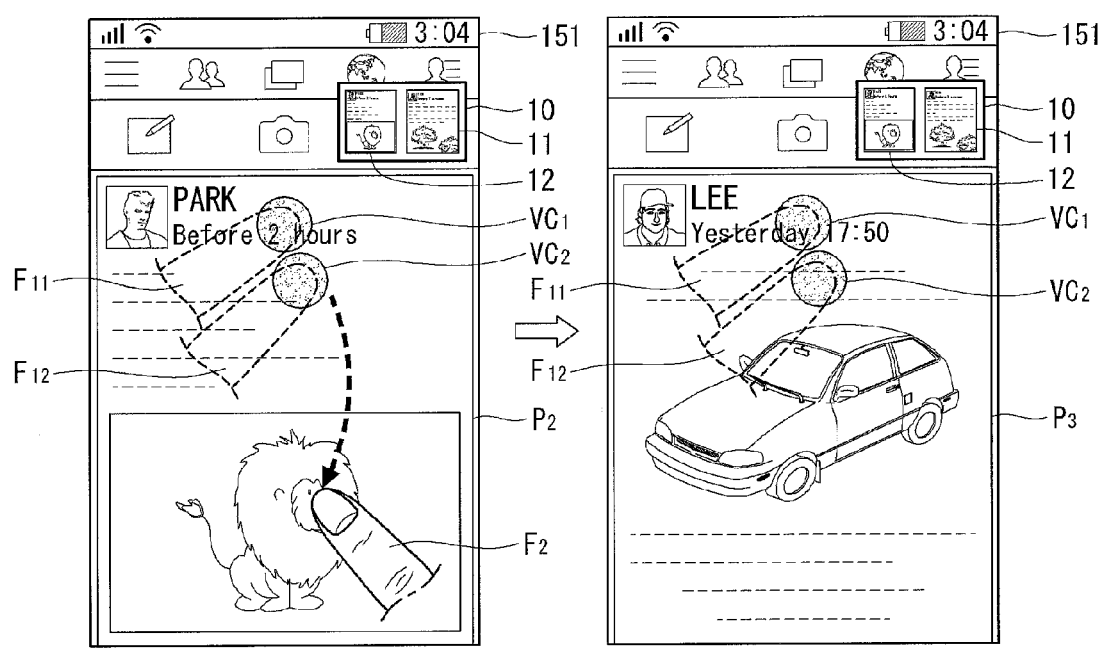

FIGS. 9a, 9b and 9c illustrate another example of adding a temporarily stored page according to the first embodiment of the present invention.

A description will be given of an example of adding a temporarily stored page through multi-touch input applied to the rear input unit.

Referring to FIG. 9a, the controller 180 may receive a second input F2 applied to the touchscreen 151 while the first rear input VC1 is maintained for the first page P1. The second input F2 may be flicking input applied to the first page P1 and the controller 180 may display the second page P2 on the touchscreen 151 in response to the flicking input, as shown in FIG. 9b.

In FIG. 9b, the controller 180 may receive a second rear input VC2 while the first rear input VC1 is maintained. The first rear input VC1 may be applied by a first finger F11 and the second rear input VC2 may be applied by a second finger F12.

The controller 180 may store the second page P2 in the standby state according to the second rear input VC2, add the thumbnail 12 corresponding to the second page P2 to the thumbnail tray 10 and display the thumbnail tray 10 including the thumbnail 12.

Referring to FIG. 9c, when flicking input applied by another finger F2 of the user to the touchscreen 151 is received while the first rear input VC1 and the second rear input VC2 are maintained, a third page P3 may be displayed on the touchscreen 151.

In the aforementioned embodiment, an example of adding a page to be stored in the standby state according to a combination of multi-touch input applied to the rear input unit, rear input and front input applied to the touchscreen has been described.

In addition, there have been described examples of restoring a predetermined page into a previous state and displaying the page on the touchscreen when the page is stored in the standby state according to the rear input and then the rear input is released.

However, when a plurality of pages is stored in the standby state, a method of restoring the pages stored in the standby state to display the pages on the touchscreen 151 may depend on a rear input release method.

A description will be given of examples of restoring a page, which has been stored in the standby state through rear input, upon release of the rear input.

Figure 10:
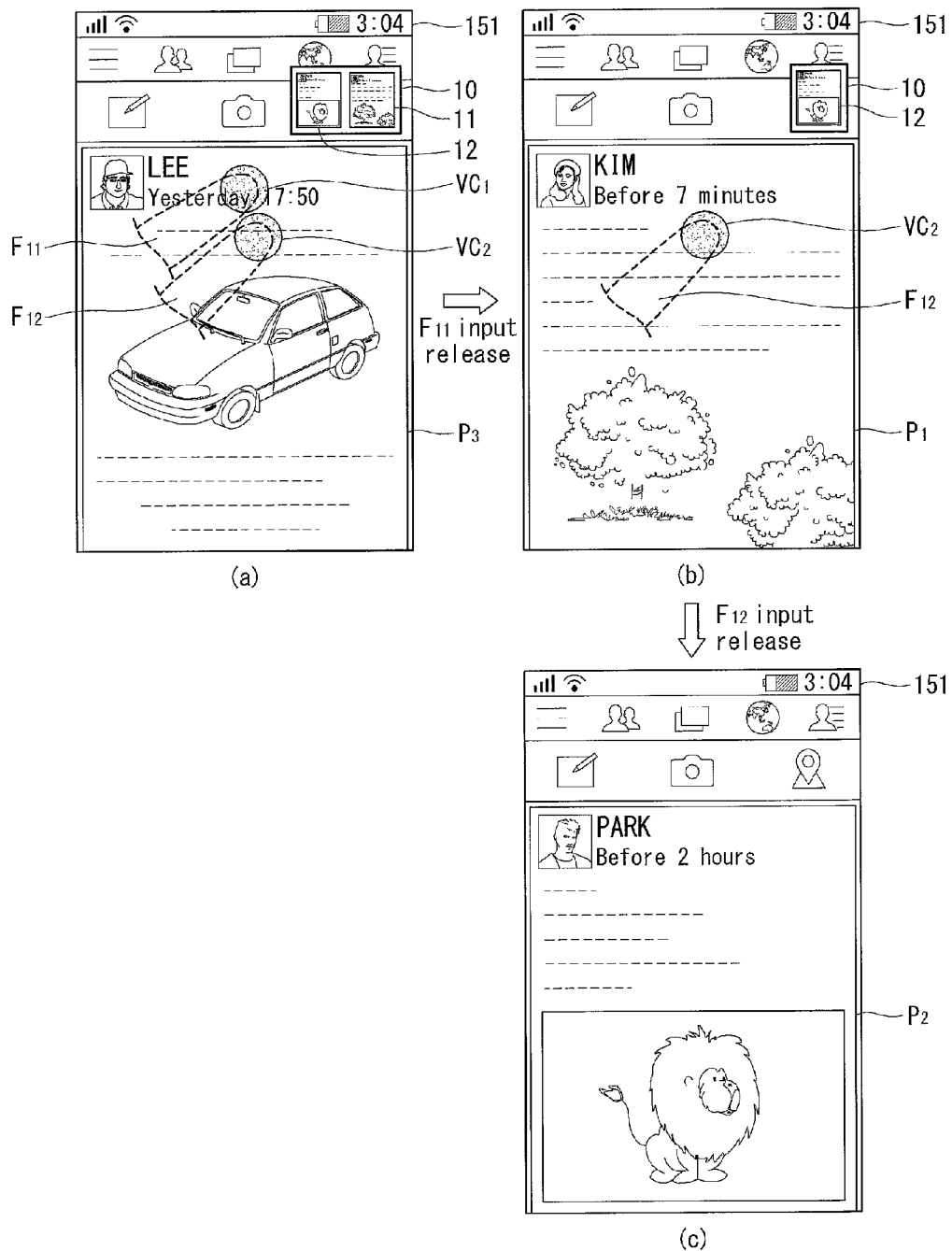
FIG. 10 is a view for explaining operation of the electronic device when rear input is released according to the first embodiment of the present invention.

FIG. 10 illustrates operation of the electronic device when rear input is released according to the first embodiment of the present invention.

Referring to FIG. 10, it is assumed that the first page P1 and the second page P2 are sequentially stored in the standby state as the first rear input VC1 and the second rear input VC2 are sequentially applied through multi-touch input applied to the rear input unit.

Upon release of the first rear input VC1, the controller 180 may display the first page P1, stored in the standby state according to the first rear input VC1, on the touchscreen 151. In addition, the controller 180 may delete the thumbnail 11 corresponding to the first page P1 from the thumbnail tray 10. Here, the second rear input VC2 may be maintained.

Upon release of the second rear input VC2, the controller 180 may display the second page P2, stored in the standby state according to the second rear input VC2, on the touchscreen 151. Similarly, the controller 180 may delete the thumbnail 12 corresponding to the second page P2 from the thumbnail tray 10. In addition, the controller 180 may delete the thumbnail tray 10 since the thumbnail tray 10 does not include a thumbnail.

While the process of re-displaying plural pages, which have been stored in the standby state through multi-touch input applied to the rear input unit, on the touchscreen has been described, the present invention is not limited thereto.

For example, when a plurality of pages is stored in the standby state according to a combination of rear input and touch input applied to the touchscreen 151 instead of multi-touch input applied to the rear input unit, the pages may be re-displayed on the touchscreen 151 according to user manipulation applied to the thumbnail tray 10, as described below.

FIGS. 11a to 11e illustrate operation of the electronic device according to manipulation of a thumbnail corresponding to a temporarily stored page.

The electronic device 100 according to an embodiment of the present invention can control display of a page corresponding to a specific thumbnail included in the thumbnail tray 10 according to a touch pattern applied to the specific thumbnail.

Figure 11A:
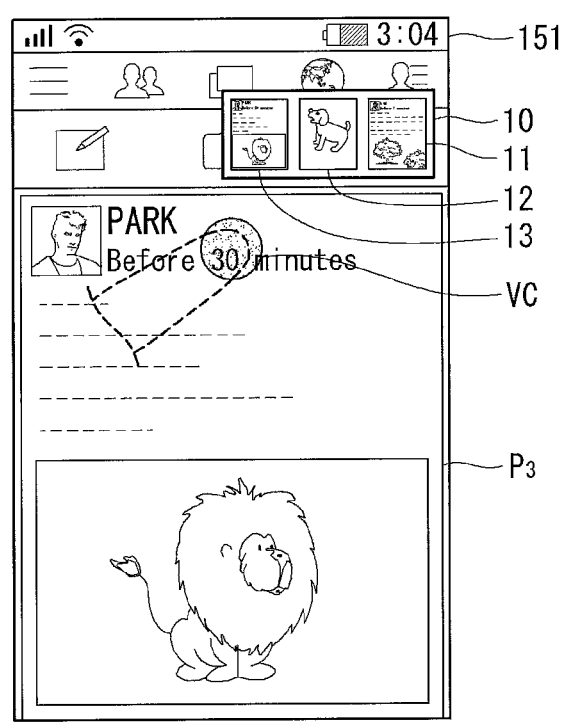
FIGS. 11a to 11e are views for explaining operation of the electronic device according to manipulation of a thumbnail corresponding to a temporarily stored page.

Referring to FIG. 11a, the thumbnail tray 10 may include the first, second and third thumbnails 11, 12 and 13 respectively corresponding to the first, second and third pages.

The first, second and third pages have been sequentially switched to the standby state and the screen shown in FIG. 11a indicates that the third page P3 currently displayed on the touchscreen 151 has been finally switched to the standby state.

When a plurality of thumbnails is present, the thumbnail (third thumbnail 13) corresponding to the current page (third page P3) displayed on the touchscreen 151 may be highlighted such that the user can intuitively recognize the page currently displayed on the touchscreen 151.

Figure 11B:
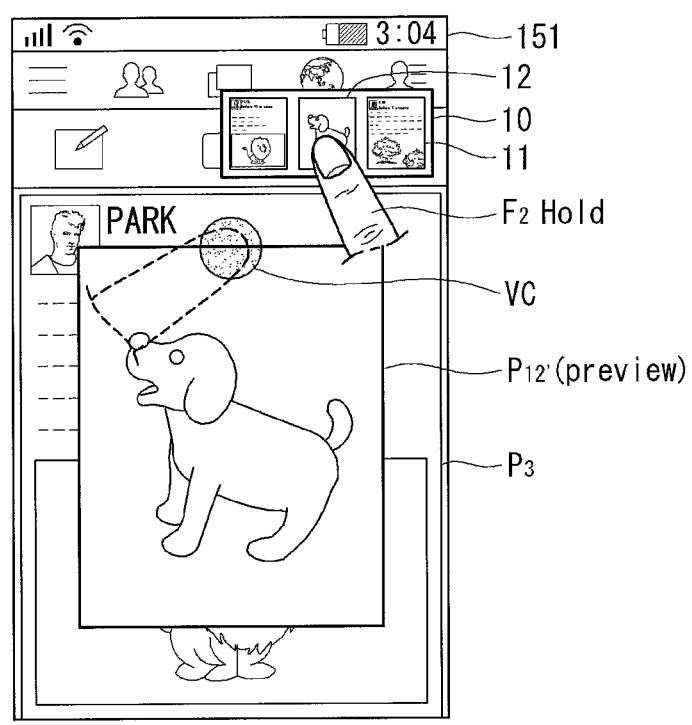

Referring to FIG. 11b, when touch input F2 for selecting the second thumbnail 12 from the plurality of thumbnails is received while the rear input VC is maintained, the controller 180 may display a preview image P12' of the second page P2 corresponding to the selected second thumbnail 12. The preview image P12' may be displayed only while the touch input F2 is maintained.

Figure 11C:
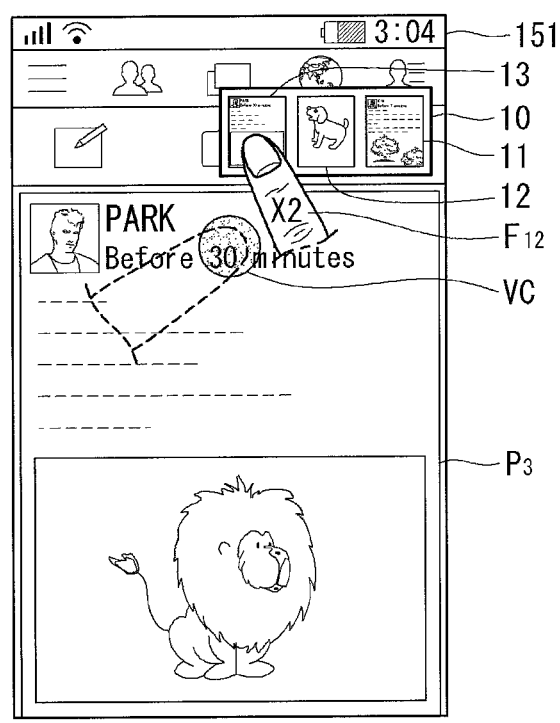

Referring to FIG. 11c, when double-touch input applied to the third thumbnail 13 from among the plurality of thumbnails includes in the thumbnail tray 10 is received while the rear input VC is maintained, the controller 180 may refresh the third page P3 corresponding to the third thumbnail 13. That is, when the third page P3 is a webpage, an updated webpage can be displayed on the touchscreen 151 upon reception of the double-touch input.

Figure 11D:
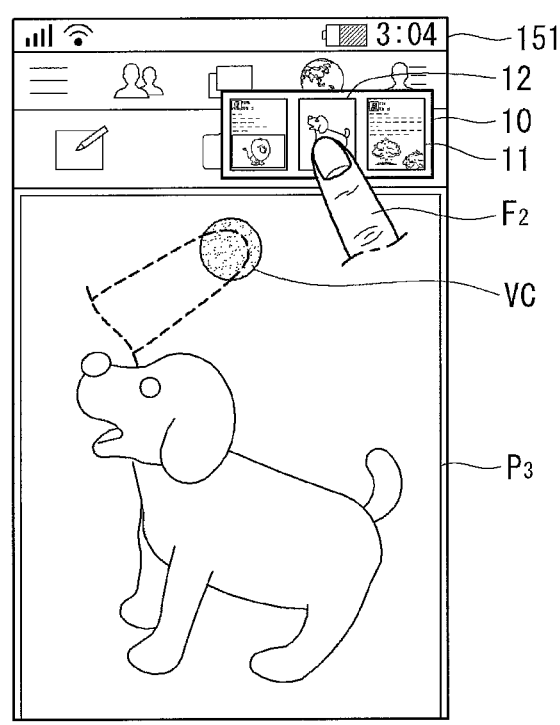

Referring to FIG. 11d, when input for selecting the thumbnail 12 corresponding to the second page P2 from the thumbnail tray 10 is received while the third page P3 is currently displayed on the touchscreen 151, the controller 180 may display the second page P2 on the touchscreen 151.

Figure 11E:
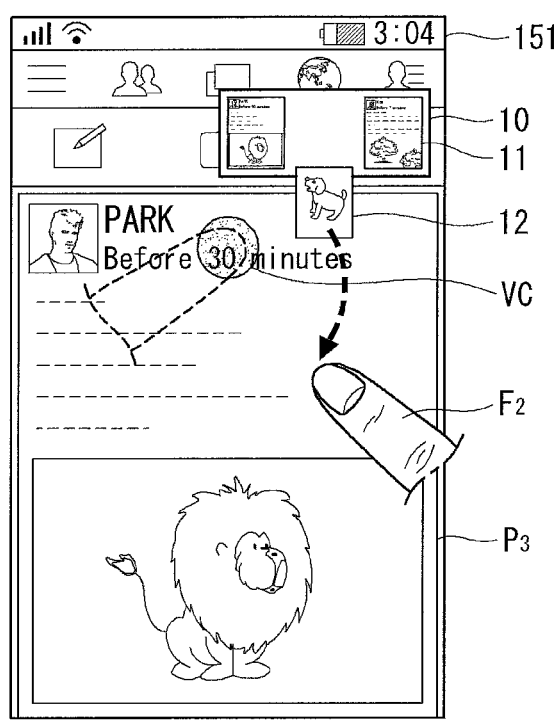

Referring to FIG. 11e, when drag input F2 for moving the second thumbnail 12 to the outside of the thumbnail tray 10 is received while the rear input VC is maintained, the controller 180 may cancel the standby state of the second page P2 corresponding to the second thumbnail 12.

As described above, when at least one page is additionally stored in the standby state through predetermined input after one-time rear input and thus at least one thumbnail is displayed in the thumbnail tray, functions of refreshing, selecting, deleting and previewing a page and switching the page to the standby state can be executed through simple manipulation of the thumbnail tray 10.

A page which enters the standby state through rear input according to an embodiment of the present invention is not limited to the aforementioned webpage. For example, when an image editing screen is displayed on the touchscreen, a simple undo function may be executed through rear input.

Figure 12:
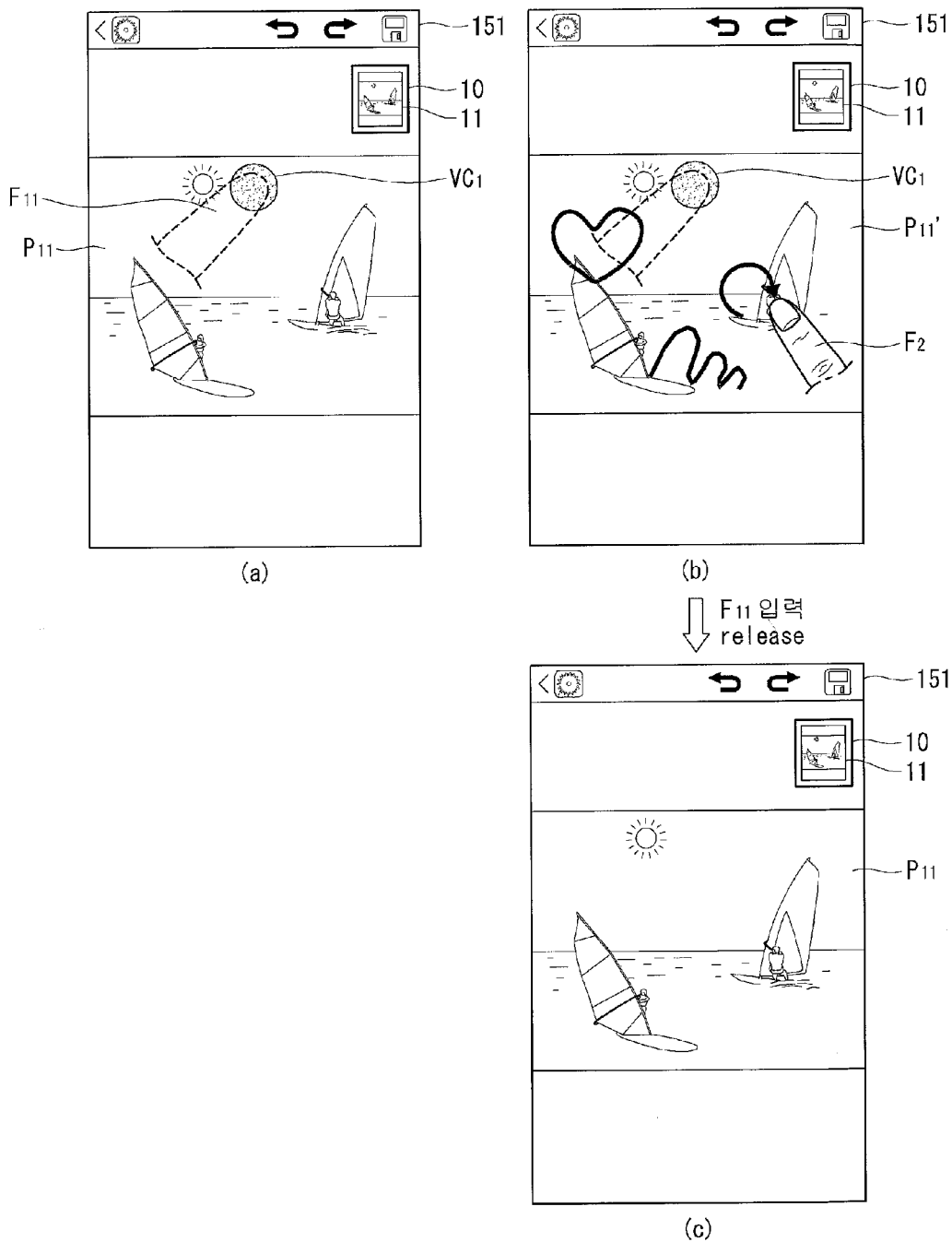
FIG. 12 illustrates a method of controlling an electronic device, in which the first embodiment of the present invention is applied to an image editing process.

FIG. 12 illustrates a method of controlling an electronic device to apply the first embodiment of the present invention to an image editing process.

Referring to FIG. 12, when rear input F11 is received while a predetermined image editing screen P1 is displayed on the touchscreen 151, the current state of the image editing screen P11 may be switched to the standby state and a thumbnail 11 corresponding to the image editing screen P11 may be displayed in the thumbnail tray 10 (refer to FIG. 12(a)).

The image editing process may be continuously performed even after the rear input F1 is received. For example, editing such as image effect, color change, notation, etc. may be performed through input F2 applied to the touchscreen 151. Here, P11' represents a screen including content edited after the rear input F11 is received.

Upon release of the rear input F11, the controller 180 may execute an undo function on the editing process back to the time when the rear input F11 is applied and re-display the image editing screen P11 before the rear input F11 on the touchscreen 151.

While the image editing screen has been exemplified, the present invention is not limited thereto. That is, the aforementioned embodiment of the present invention can be applied to any editing application.

The method of controlling an electronic device according to the first embodiment of the present invention is applicable to composition of a webpage and content included in the webpage.

Figure 13A:
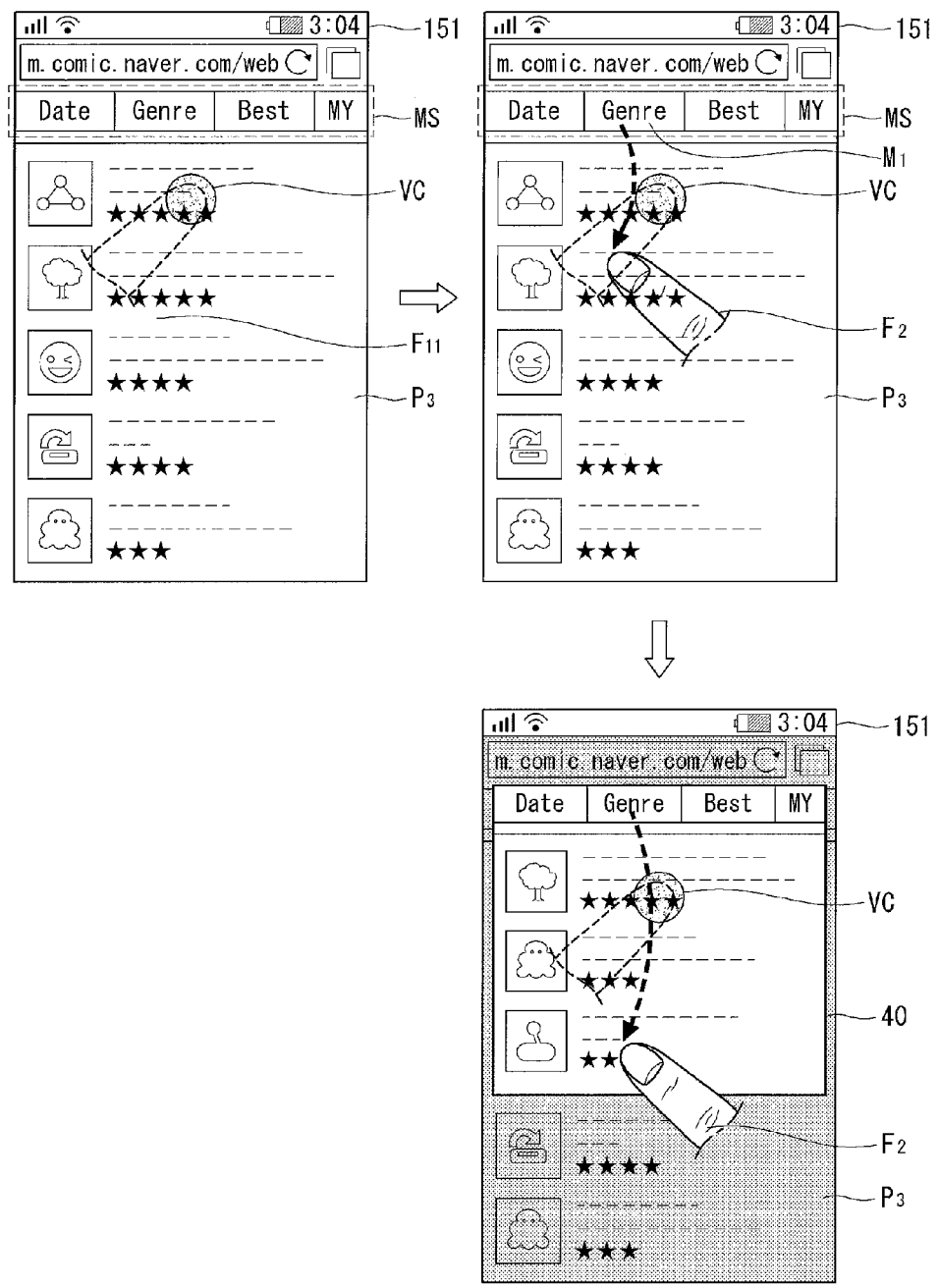
FIGS. 13a and 13b illustrate a method of controlling an electronic device, in which the first embodiment of the present invention is applied to a menu of a webpage.
Figure 13B:
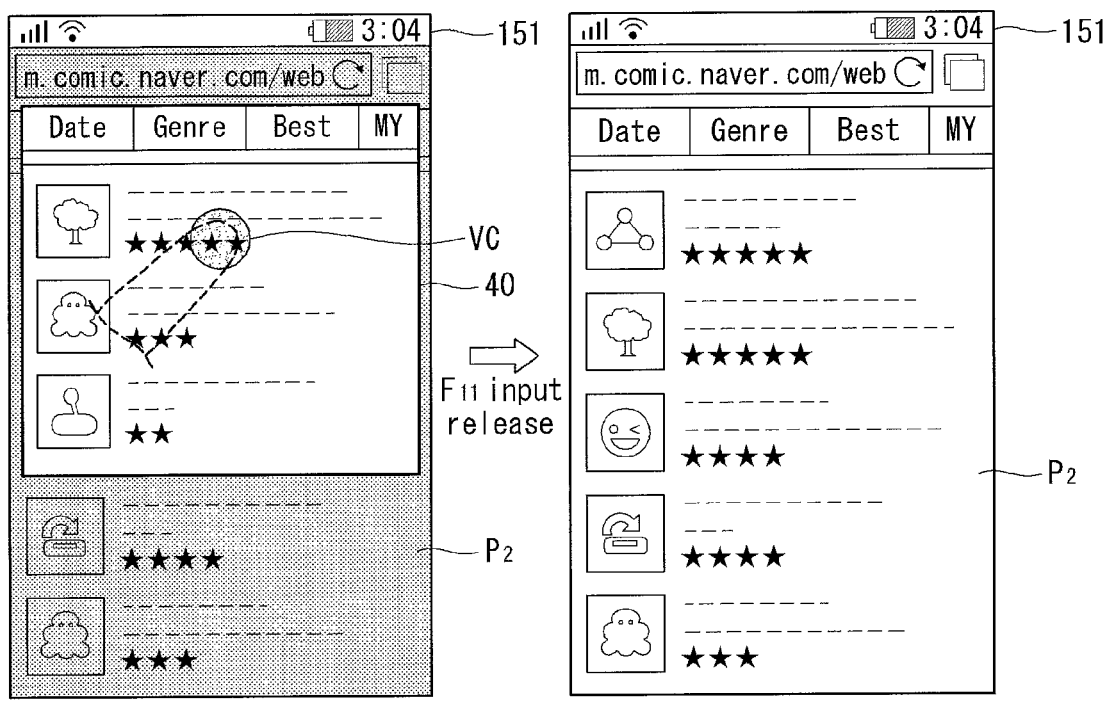

FIGS. 13a and 13b illustrate a method of controlling an electronic device to apply the first embodiment of the present invention to a webpage menu.

Referring to FIG. 13a, the controller 180 may display a webpage P3 including at least one submenu MS on the touchscreen 151. The submenu MS has a predetermined depth relation with the currently displayed webpage. To access the submenu MS, the webpage needs to be displayed first.

A rear input F11 may be received while the webpage P2 is displayed and a second input F2 for selecting one menu M1 from the submenu SM of the webpage may be received while the rear input F11 is maintained.

The second input F2 may be input of dragging the submenu MS upward. The controller 180 may display a window 40 including items provided through the submenu MS on the touchscreen 151 on the basis of the drag input.

Here, display of the webpage P3 is maintained since the rear input VC is maintained.

Referring to FIG. 13b, when predetermined flicking input applied to the window 40 including the items provided through the submenu MS is received, a function of searching the items may be executed.

Upon release of the rear input VC, the controller 180 may delete the window 40. Accordingly, only a webpage P1 in a standby state can be displayed on the touchscreen 151.

Figure 14A:
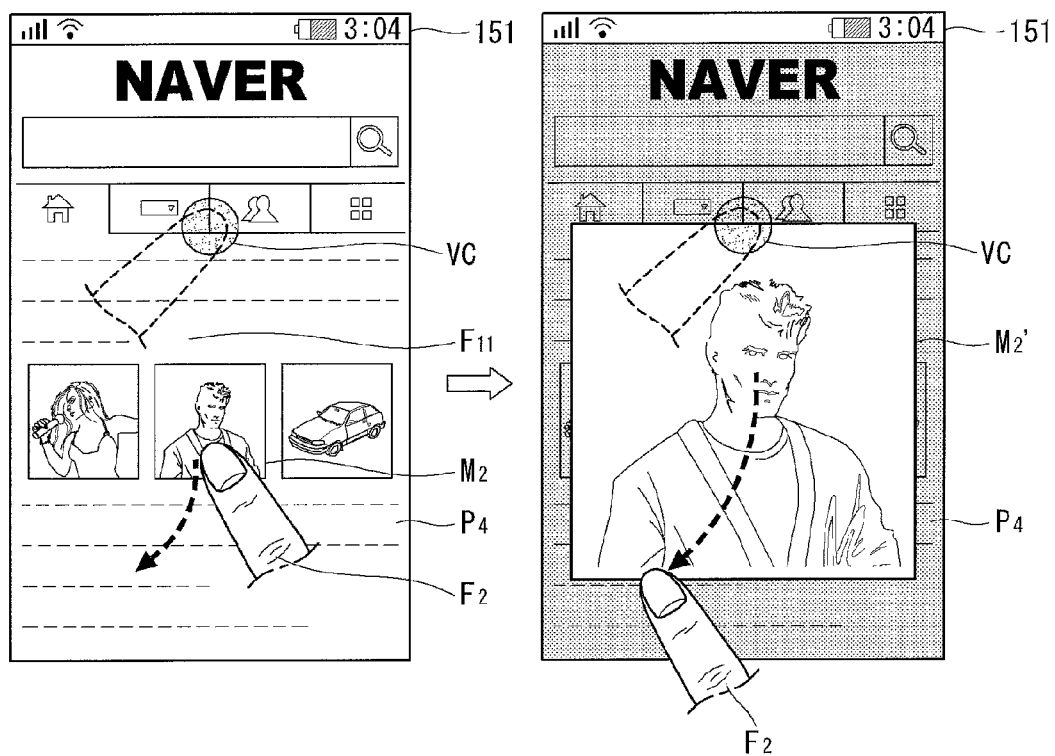
FIGS. 14a and 14b illustrate a method of controlling an electronic device, in which the first embodiment of the present invention is applied to content included as a component of a specific page.
Figure 14B:
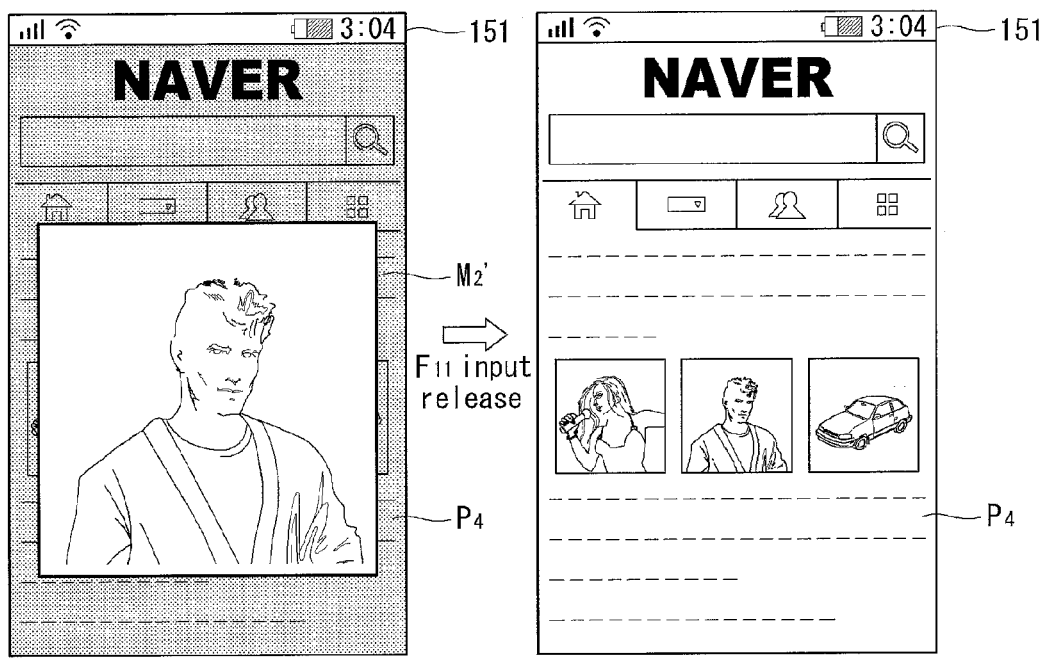

FIGS. 14a and 14b illustrate a method of controlling an electronic device to apply the first embodiment of the present invention to content included as a component in a specific page.

Referring to FIG. 14a, when rear input VC is received while a webpage P4 is displayed on the touchscreen 151 and drag input applied to predetermined content M2 provided as a component of the webpage P4 is received while the rear input VC is maintained, a predetermined layer may be displayed on the touchscreen according to the drag input.

The controller 180 may control the size of the layer to vary according to the length of the drag input and control the content M2' to be provided through the layer.

Referring to FIG. 14b, upon release of the rear input VC, the layer disappears and the webpage P4 is displayed.

According to the embodiment of the present invention, it is possible to check items of the submenu while the current webpage is displayed on the touchscreen 151, distinguished from the conventional scheme in which the submenu is selected and a submenu screen is displayed on the touchscreen 151 in order to access an item provided through the submenu, which is included as a component of the webpage in the webpage.

A description will be given of an example of changing composition of a page displayed on the touchscreen 151 according to a predetermined input pattern applied to the touchscreen 151 while rear input is maintained.

Figure 15A:
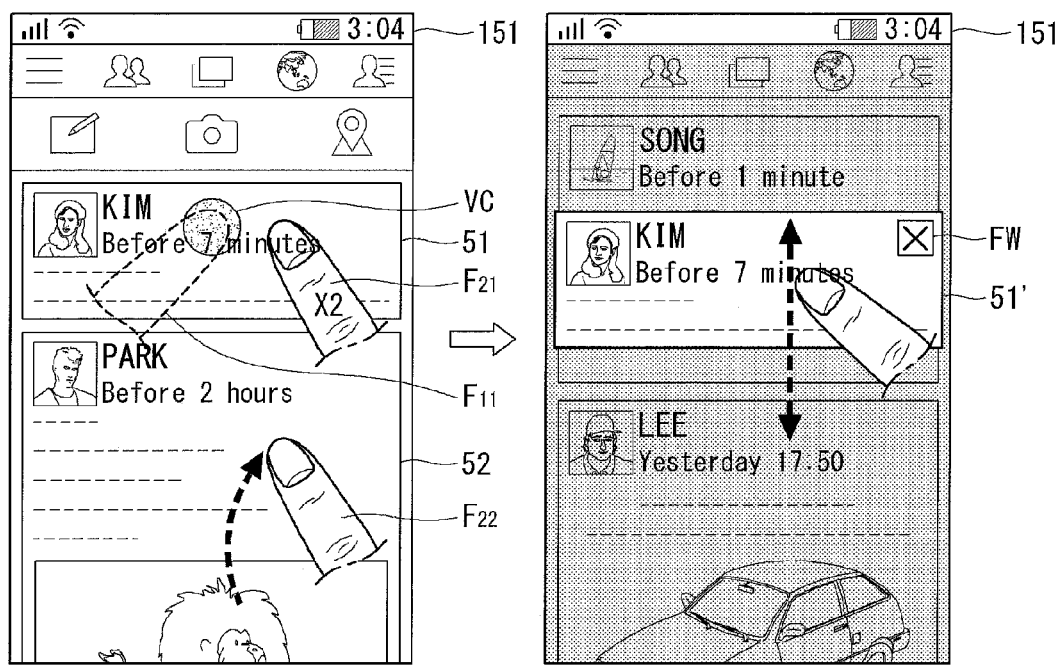
FIGS. 15a and 15b illustrate an example of generating a floating window using the method of controlling an electronic device according to the first embodiment of the present invention.
Figure 15B:
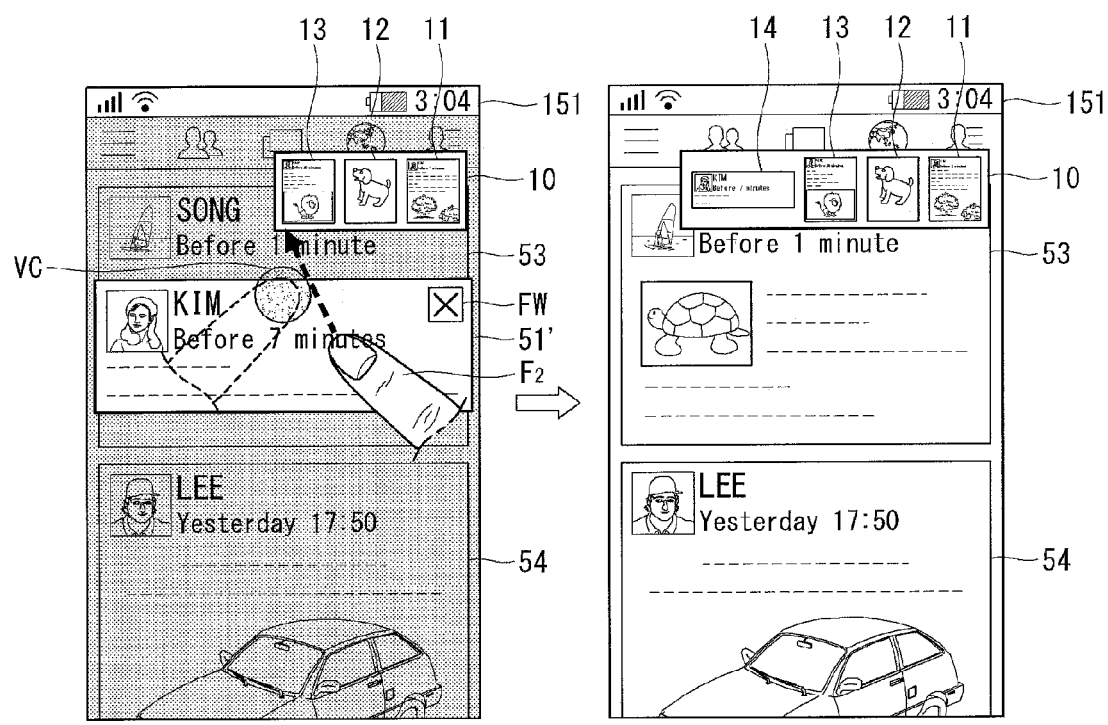

FIGS. 15a and 15b illustrate an example of generating a floating window through the method of controlling an electronic device according to the first embodiment of the present invention.

The electronic device 100 according to an embodiment of the present invention can separate a component of an image displayed on the touchscreen from the image and display the component as a floating window upon reception of input in a predetermined pattern applied to the component of the image displayed on the touchscreen.

Referring to FIG. 15a, a webpage displayed on the touchscreen 151 may be divided into a plurality of blocks each of which is provided with predetermined content. Accordingly, the webpage providing predetermined content through first and second blocks 51 and 52 can be displayed on the touchscreen 151, as shown in FIG. 15a. In addition, a plurality of new blocks may be displayed on the touchscreen 151 through flicking input.

When rear input VC is received while the webpage including the first and second blocks 51 and 52 is displayed on the touchscreen and predetermined touch input (e.g. double touch input) applied to the first block 51 is received while the rear input VC is maintained, the first block 51 may be separated from the webpage and content 51' of the first block 51 may be displayed in an independent floating window FW.

The floating window FW is movable over the entire area of the touchscreen 151 and may have attributes of a pop-up window.

The floating window FW may not disappear from the touchscreen 151 even when the rear input VC is released and may be deleted from the touchscreen 151 through a delete button.

Referring to FIG. 15b, upon reception of the rear input VC while the webpage including the first and second blocks 51 and 52 is displayed on the touchscreen 151, thumbnails 11, 12 and 13 respectively corresponding to pages in the standby state may be displayed on the touchscreen 151, as described above.

When input F2 for moving the floating window FW to the thumbnail tray 10 is received while the rear input VC is maintained and the thumbnail tray 10 is displayed, the state of the first block 51 separated from the webpage and provided through the floating window FW may be switched to the standby state and a thumbnail 14 corresponding to the floating window FW may be displayed in the thumbnail tray 10.

Organic operations of the block provided through the floating window FW and the thumbnail tray 10 may be equally applied to the aforementioned embodiments. Particularly, it can be known from the embodiment described with reference to FIGS. 15a and 15b that the embodiments of the present invention can be extended and applied to a case in which only a component included in the page displayed on the touchscreen 151 is separated from the page through a floating window and switched to the standby state while the page displayed on the touchscreen 151 may be switched to the standby state through rear input.

The example of generating a floating window FW through rear input according to the aforementioned embodiment of the present invention is applicable to a function of capturing part of an image.

For example, when rear input VC is received while a page divided into one or more blocks is displayed on the touchscreen 151 and touch input (e.g. long touch input, double touch input, etc.) in a predetermined pattern, applied to a specific block, is received while the rear input VC is maintained, only the specific block can be captured to generate a capture image.

Content which is displayed on the touchscreen and can be switched to the standby state through rear input is not limited to the aforementioned examples and the present invention is applicable to various types of content displayed on the touchscreen.

FIGS. 16a, 16b, 17a and 17b illustrate application of the method of controlling an electronic device according to the first embodiment of the present invention to an image composition process.

The method of controlling an electronic device according to the first embodiment of the present invention is applicable to a camera application execution process.

Figure 16A:
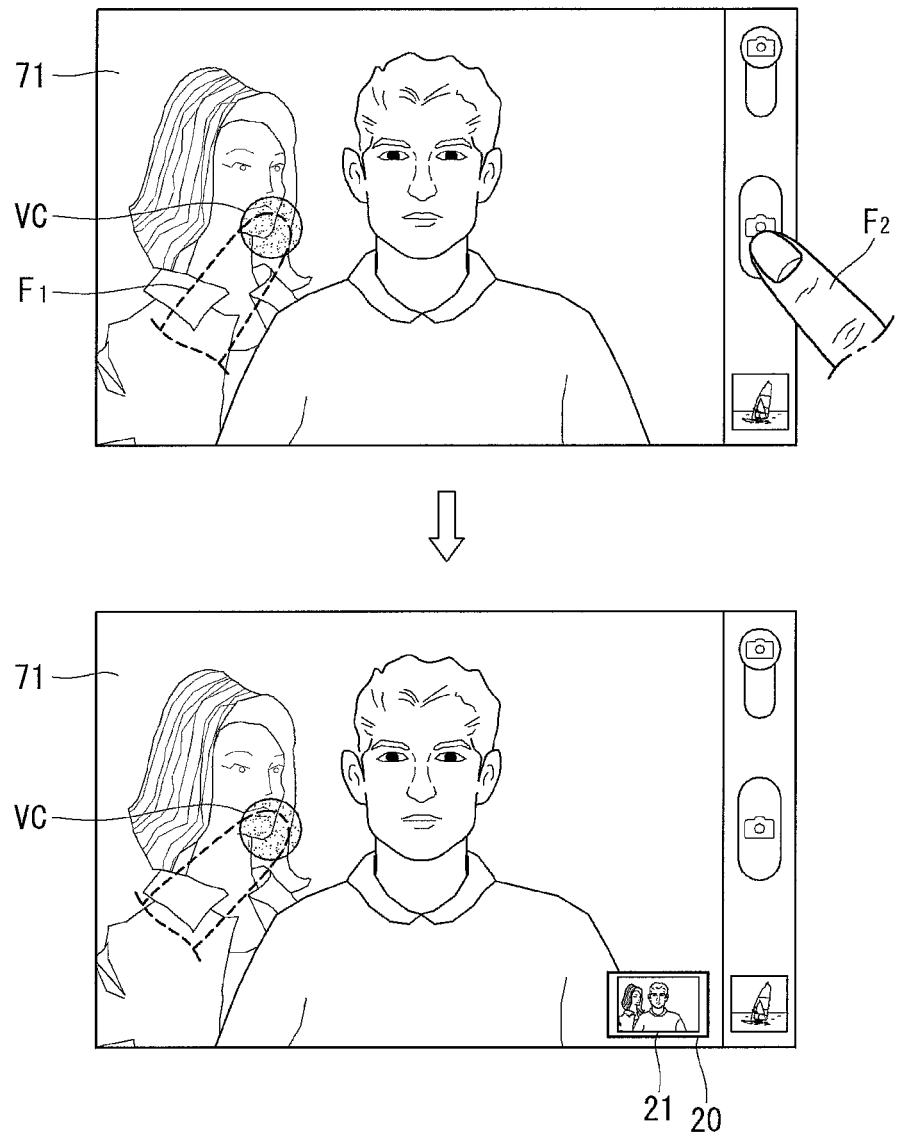
FIGS. 16a, 16b, 17a and 17b illustrate an example of applying the method of controlling an electronic device according to the first embodiment of the present invention to an image composition process.

Referring to FIG. 16a, the controller 180 may execute a camera application and receive rear input VC while a preview image 71 captured through the camera is displayed on the touchscreen 151. Upon reception of key input for capturing an image while the rear input VC is maintained, the controller 180 may capture the first preview image 71 and display a thumbnail 21 corresponding to the captured image on the touchscreen 151.

Figure 16B:
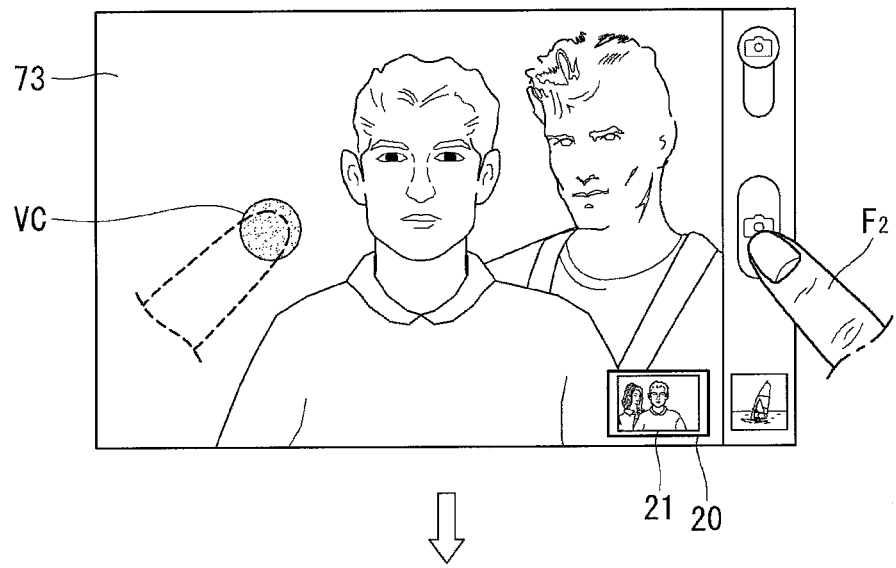
Figure 16B:
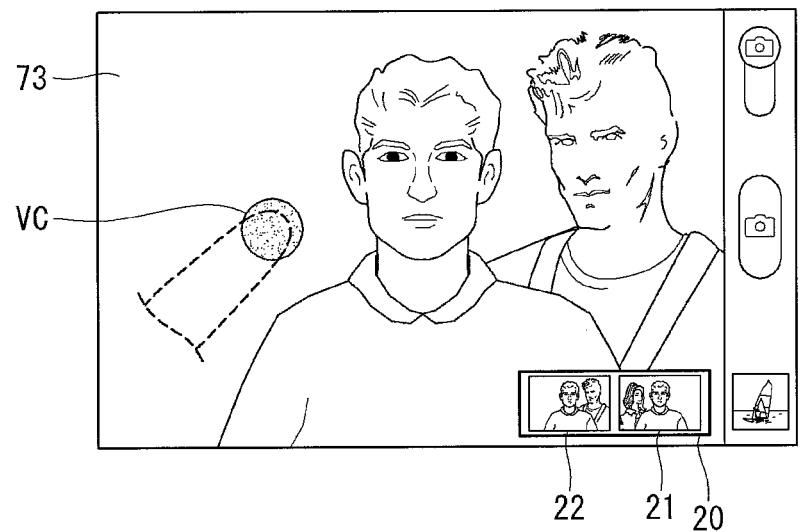

Referring to FIG. 16b, after the first preview image 71 has been captured, the controller 180 may capture a second preview image 72 different from the first preview image 71 while the rear input VC is maintained. The controller 180 may display a thumbnail 22 corresponding to the captured image of the second preview image 72 on the touchscreen 151 along with the thumbnail 21 corresponding to the previously captured image of the first preview image 71.

As described above with reference to FIGS. 16a and 16b, the first embodiment of the present invention is applicable to a case in which an image captured through rear input is temporarily stored in the standby state.

Upon release of the rear input VC while the two thumbnails 21 and 22 are displayed in the thumbnail tray 10, the controller 180 may delete the thumbnail tray 10 and cancel the standby state of the temporarily stored captured image.

A description will be given of a process of editing two capture images temporarily stored in the standby state according to the first embodiment of the present invention.

Figure 17A:
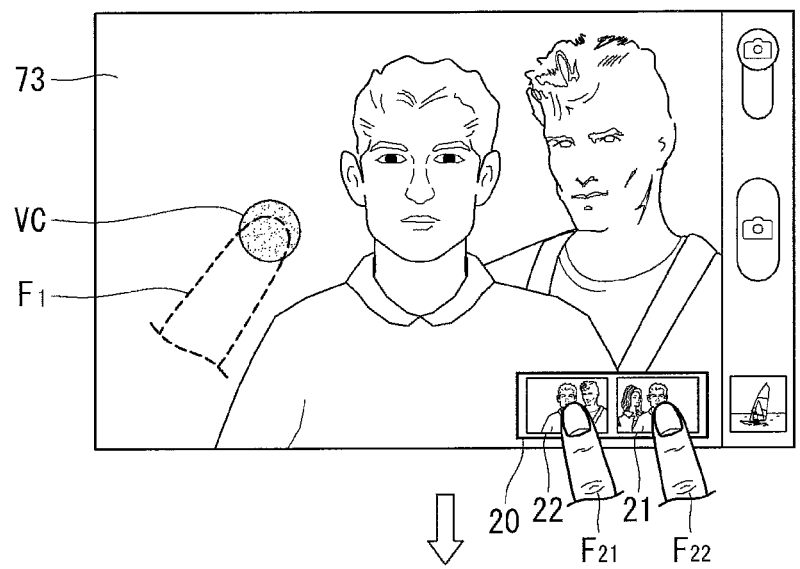
Figure 17A:
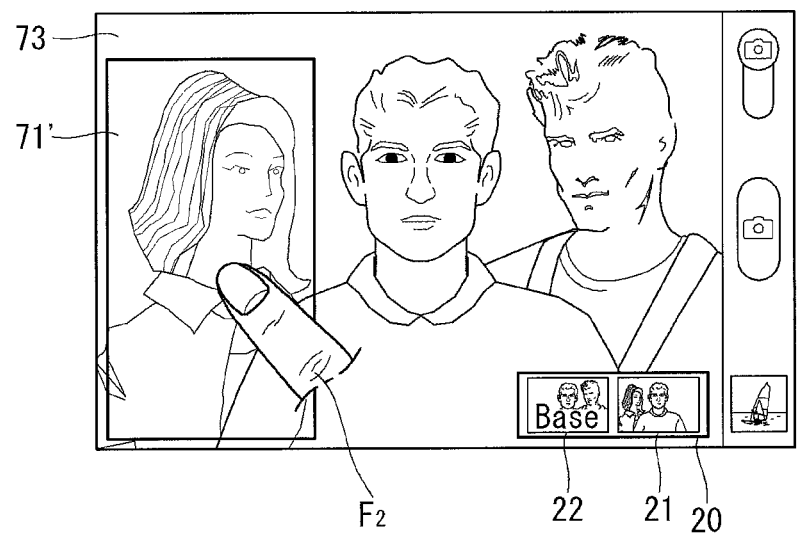

Referring to FIG. 17a, it is assumed that the rear input VC is maintained in the display state shown in FIG. 16b.

The controller 180 may receive input F21 for selecting the first thumbnail 21 from the two thumbnails 21 and 22 included in the thumbnail tray 10 and then receive input F22 for selecting the second thumbnail 22.

The controller 180 may edit the capture image corresponding to the second thumbnail 22 using the capture image corresponding to the first thumbnail 21 as a base image 73 according to the first received input F21.

Referring to FIG. 17a, when the image to be edited overlies the base image 73 and input for selecting at least part 71' of the to-be-edited image is received, the controller 180 may compose a new image (75 of FIG. 17b) from the selected part 71' and the base image 73.

Figure 17B:
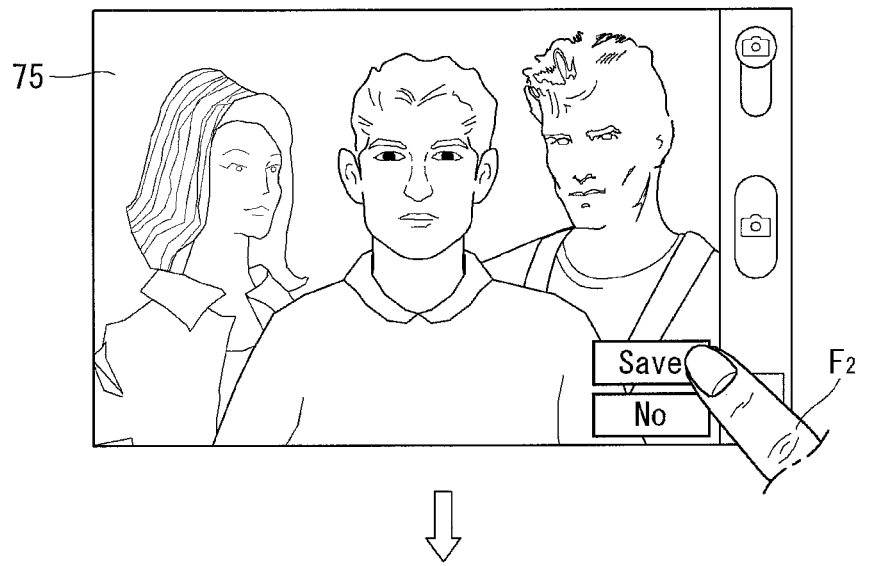
Figure 17B:
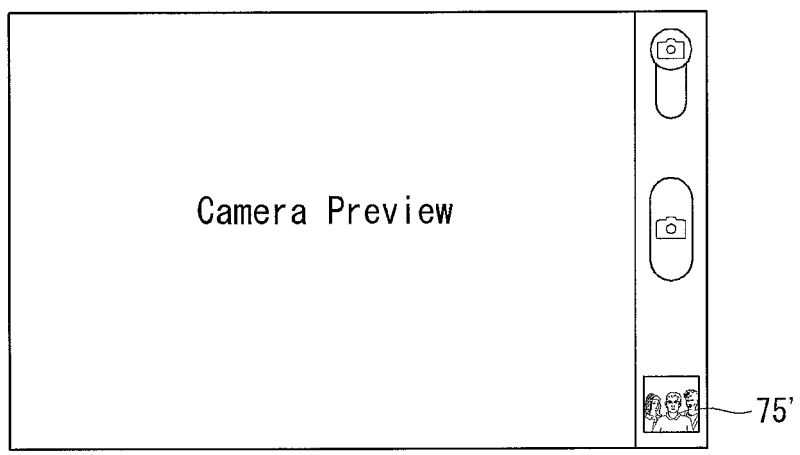

Referring to FIG. 17b, upon reception of input for storing the composed image 75, a thumbnail 75' corresponding to the composed image 75 may be displayed in a region for displaying a thumbnail corresponding to a finally captured image.

FIGS. 18a, 18b, 19a and 19b illustrate a method of controlling an electronic device according to a second embodiment of the present invention.

The controller 180 may display a page related to at least one item on the touchscreen 151.

The at least one item may include execution screens of applications that can be executed in the electronic device 100, such as an image, a webpage, a phonebook, etc.

Rear input may include touch-and-drag input applied through the rear input unit (133a of FIG. 3b) and the controller 180 may flip the page displayed on the touchscreen 151 and display the back of the page on the touchscreen 151 in response to the touch-and-drag input.

When the back of the page is displayed, the electronic device 100 may enter a writing input mode. The writing input mode may refer to a mode in which writing input can be applied to the back of the page and displayed on the back of the page in real time.

That is, the electronic device 100 may enable note input (writing input) without executing an additional notepad application on the basis of rear input of the touch-and-drag pattern.

Figure 18A:
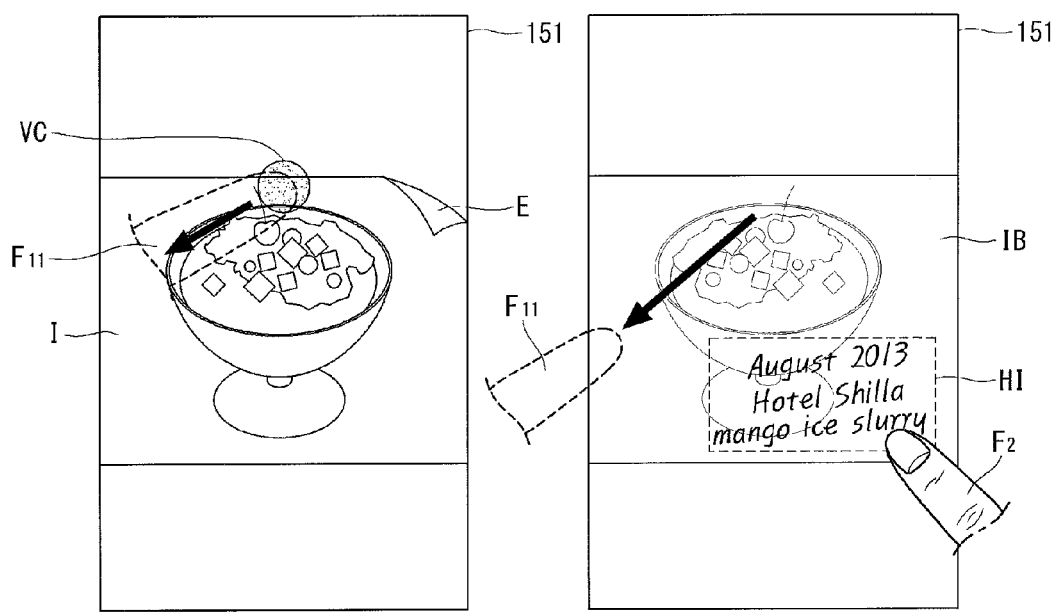
FIGS. 18a, 18b, 19a and 19b illustrate a method of controlling an electronic device according to a second embodiment of the present invention.

Referring to FIG. 18a, while a predetermined image I is displayed on the touchscreen 151, the controller 180 may receive touch input applied to the rear input unit and receive input of dragging the touch input in a first direction.

The controller 180 may flip the image I from a corner E of the image I to display the back IB of the image in response to the touch-and-drag input. The animation effect applied when the back IB of the image I is displayed on the basis of the touch-and-drag input is not limited to the aforementioned example and various animation effects can be used.

The controller 180 may receive handwriting input HI applied to the back IB of the image and display the handwriting input HI while the rear input VC is maintained.

Figure 18B:
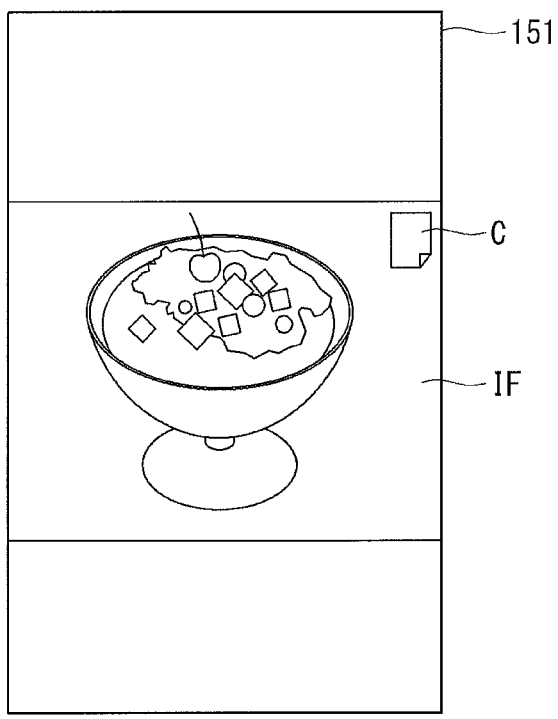

Referring to FIG. 18*b*, when predetermined input is received after the handwriting input HI is ended, the controller 180 may end the writing input mode and flip the image to display the front of the image. Here, the predetermined input may be input of dragging the rear input in a second direction opposite to the first direction.

The controller 180 may display a note icon C at a corner of the image IF to indicate presence of the note on the back of the image.

The method of controlling an electronic device according to the second embodiment of the present invention is applicable to pages other than images.

Figure 19A:
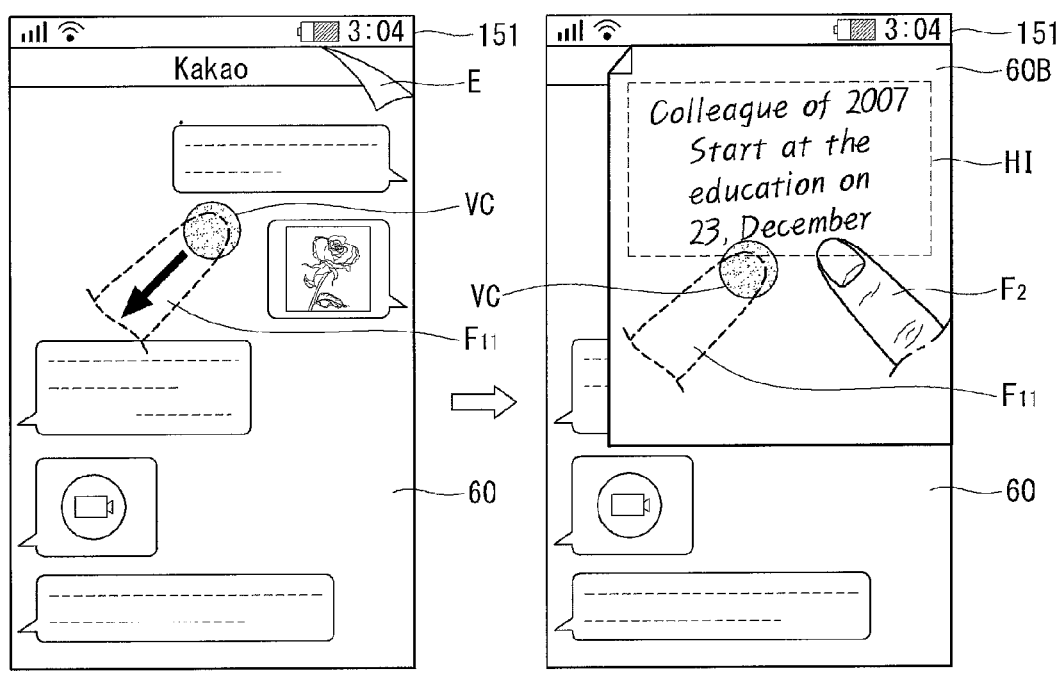
Figure 19B:
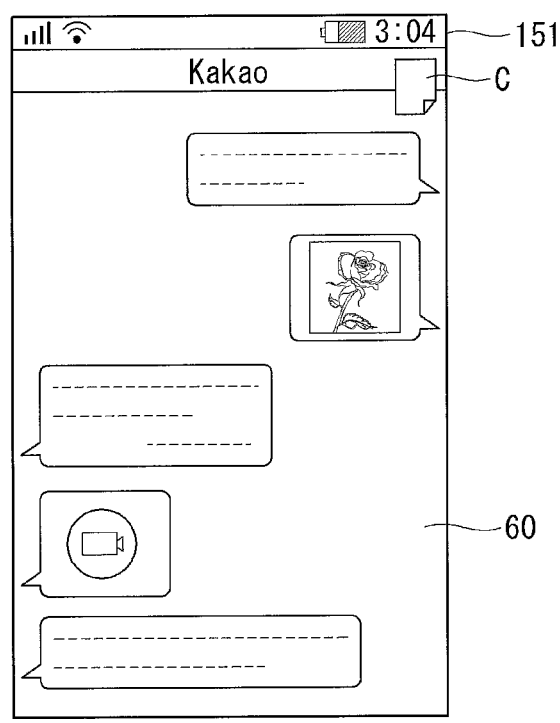

Referring to FIG. 19*a*, the controller 180 may display a phonebook page 60 on the touchscreen 151. Upon reception of rear input VC in a touch-and-drag pattern while the phonebook page 60 is displayed on the touchscreen 151, the phonebook page 60 may be flipped and a notepad 60B may be displayed on the touchscreen 151.

Upon reception of input in a predetermined pattern after handwriting input to the notepad 60B, the controller 180 may display the front side of the phonebook page 60 on the touchscreen 151 and display the note icon C indicating presence of the note on a region of the phonebook page 60.

According to the embodiment of the present invention, it is possible to flip a predetermined image and use the same as a notepad through rear input without executing an additional notepad application.

Figure 20:
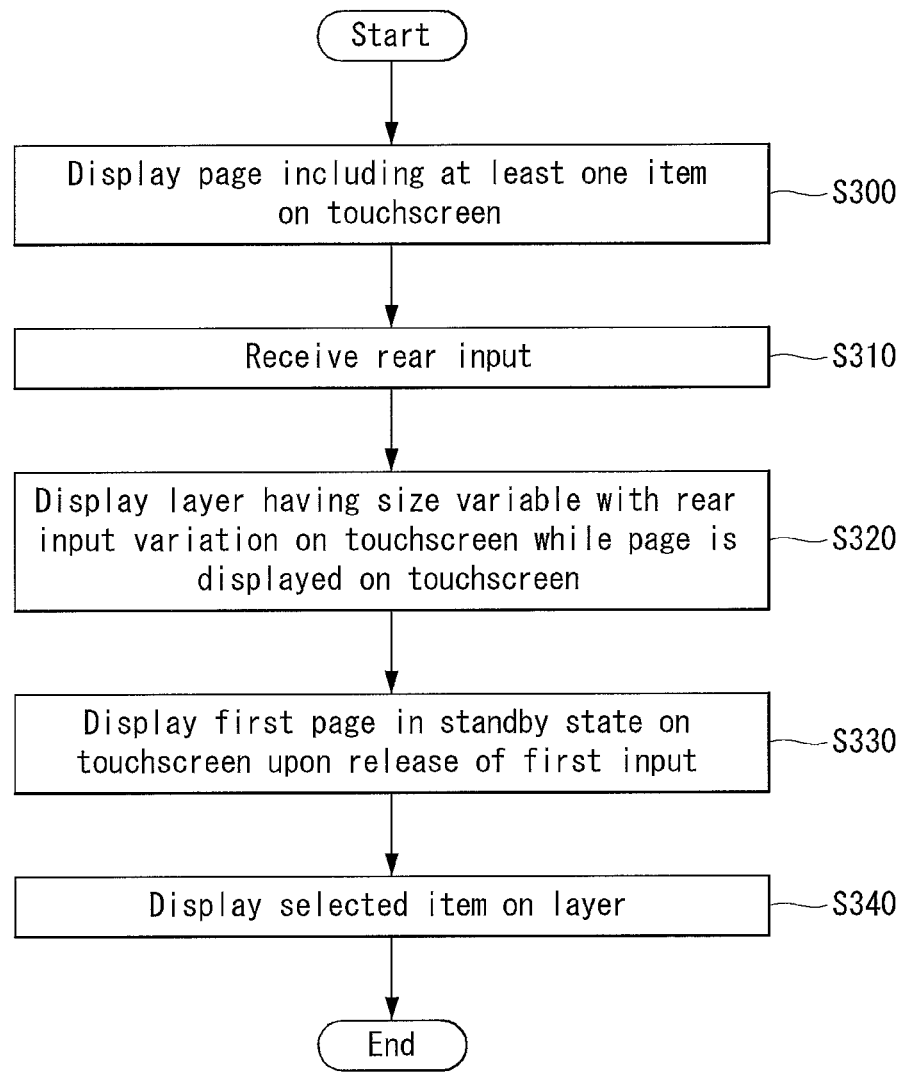
FIG. 20 is a flowchart illustrating a method of controlling an electronic device according to a third embodiment of the present invention.
Figure 21A:
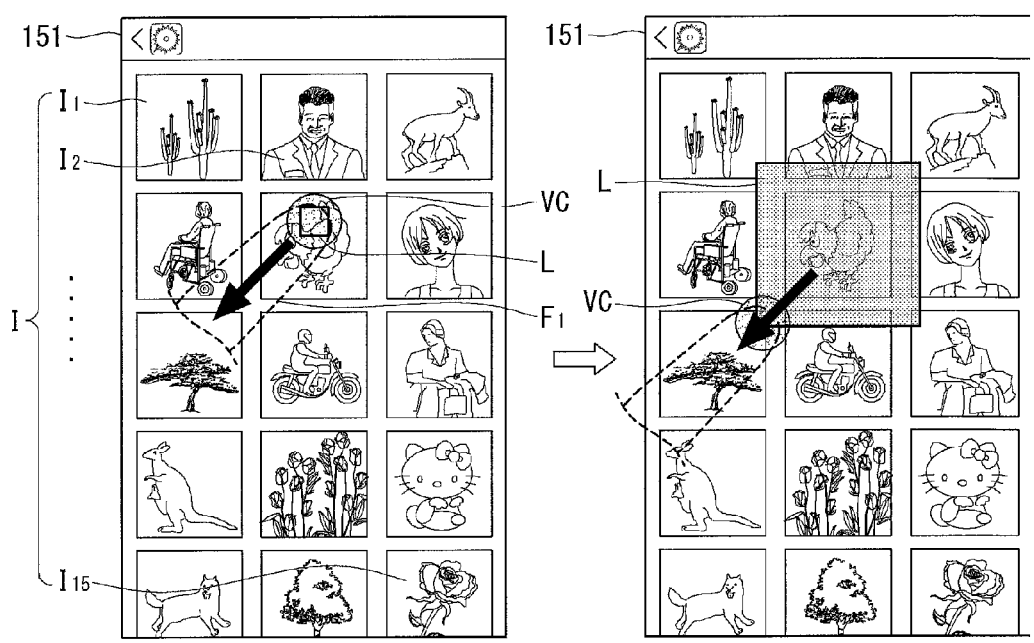
FIGS. 21a and 21b are views for explaining the method of controlling an electronic device according to the third embodiment of the present invention.
Figure 21B:
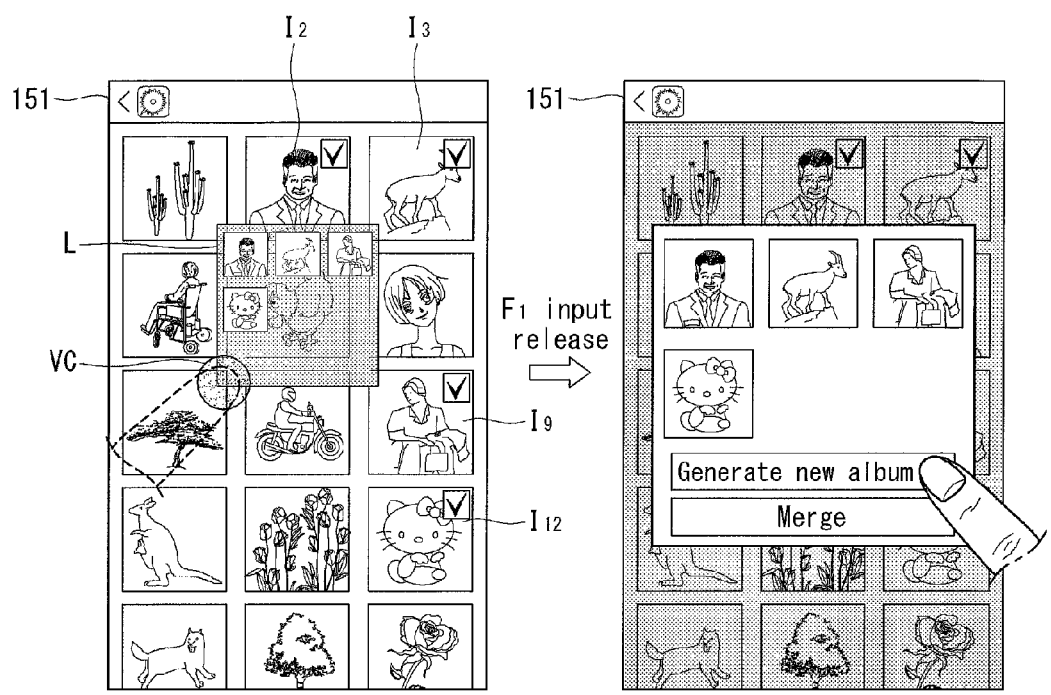

FIG. 20 is a flowchart illustrating a method of controlling an electronic device according to a third embodiment of the present invention and FIGS. 21*a* and 21*b* are views for explaining the method of controlling an electronic device according to the third embodiment of the present invention.

The method of controlling an electronic device according to the third embodiment of the present invention may be implemented in the electronic device 100 aforementioned with reference to FIGS. 1, 2 and 3. The method of controlling an electronic device according to the third embodiment of the present invention and operations of the electronic device 100 to implement the method will now be described in detail with reference to the attached drawings. The third embodiment of the present invention may be implemented on the basis of the first embodiment of the present invention.

The method of controlling an electronic device according to the third embodiment of the present invention will now be described with reference to FIGS. 20, 21*a* and 21*b*.

Referring to FIG. 20, the controller 180 may display a page including at least one item on the touchscreen 151 (S300).

The controller 180 may receive rear input through the rear input unit (133*a* of FIG. 3*b*) while the page is displayed on the touchscreen 151 (S310). The rear input may be input of dragging touch applied to the rear input unit in a predetermined direction. The rear input may be applied as described in the first embodiment.

Referring to FIG. 21*a*, the at least one item may be an image. For example, first, to fifth images 11 to 115 may be displayed on the touchscreen 151. Upon reception of the rear input VC while the at least one image is displayed on the touchscreen 151, a layer L may be generated and displayed on a point of the touchscreen 151, which corresponds to the point to which the rear input VC is applied.

The transparency of the layer L may be controlled to project the at least one item.

The controller 180 may display a layer having a size that can be changed according to variation in the rear input on the touchscreen 151 while the page is displayed on the touchscreen 151 (S320).

Specifically, a layer having a first size is displayed on the touchscreen 151 upon reception of touch input applied to the rear input unit and, when the touch input is dragged to a predetermined direction, the layer is changed from the first size to a second size on the basis of the point to which the touch input is applied.

The generated layer may overlie the page including the at least one item, displayed on the touchscreen 151.

Referring back to FIG. 20, the controller 180 may receive input for selecting at least one item while the rear input is maintained (S330) and display the selected item on the layer (S340).

Referring to FIG. 21*b*, upon reception of input for selecting one or more images I2, I3, I9 and I12 from the images displayed on the touchscreen 151, the controller 180 may display the selected images I2, I3, I9 and I12 on the layer L. The selected images I2, I3, I9 and I12 may be displayed on the layer L in such a manner that the images I2, I3, I9 and I12 displayed on the touchscreen 151 are copied to the layer L.

Upon release of the rear input VC, the controller 180 may generate a new folder corresponding to the layer L including the selected images I2, I3, I9 and I12.

The controller 180 may display a menu for inquiring whether to generate a new folder corresponding to the layer L on the touchscreen 151.

The third embodiment of the present invention can generate a virtual folder through rear input and store at least one of items displayed on the touchscreen 151 in the virtual folder.

Figure 22:
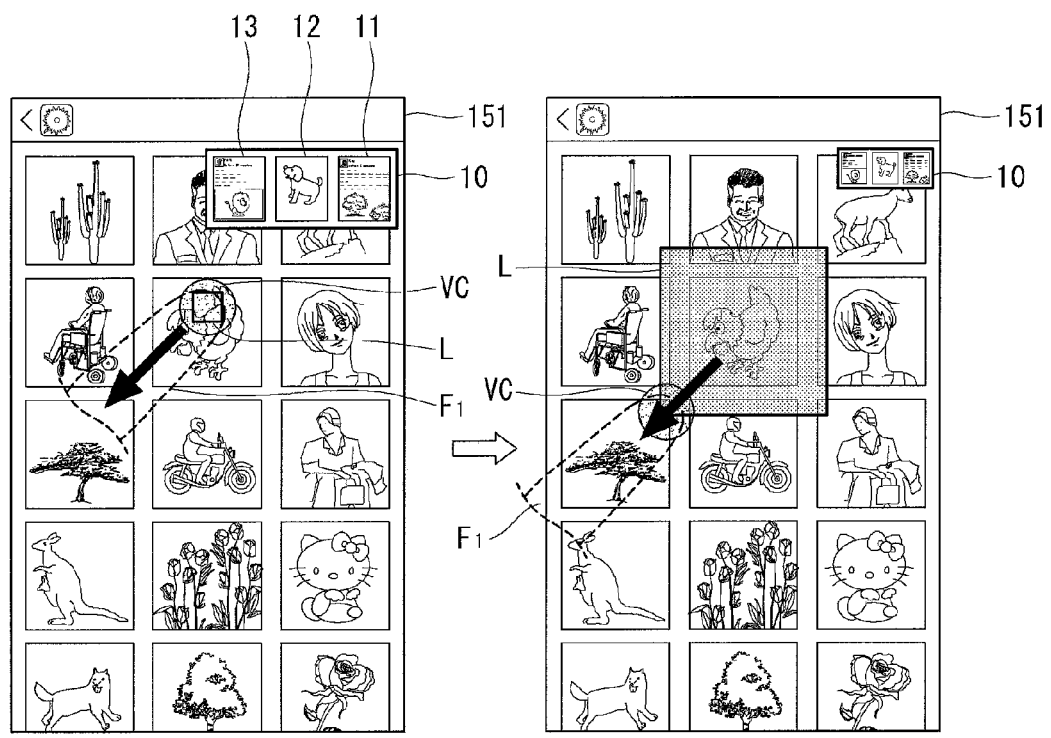
FIG. 22 illustrates an example of simultaneously applying the first and second embodiments of the present invention.

FIG. 22 illustrates an example of simultaneously applying the first and third embodiments of the present invention.

Referring to FIG. 22, when the rear input VC is received while a page including at least one item (e.g. multiple images) is displayed on the touchscreen 151, the controller 180 may switch the state of the page to the standby state. The controller 180 may display thumbnails 11, 12 and 13 prestored in the standby state on the touchscreen 151 through the rear input VC. The thumbnails 11, 12 and 13 may be displayed in the thumbnail tray 10.

When the rear input VC is dragged to a predetermined direction, the controller 180 may display the aforementioned layer L on the touchscreen 151 while reducing the size of the displayed thumbnail tray 10 or increasing the transparency thereof.

Figure 23A:
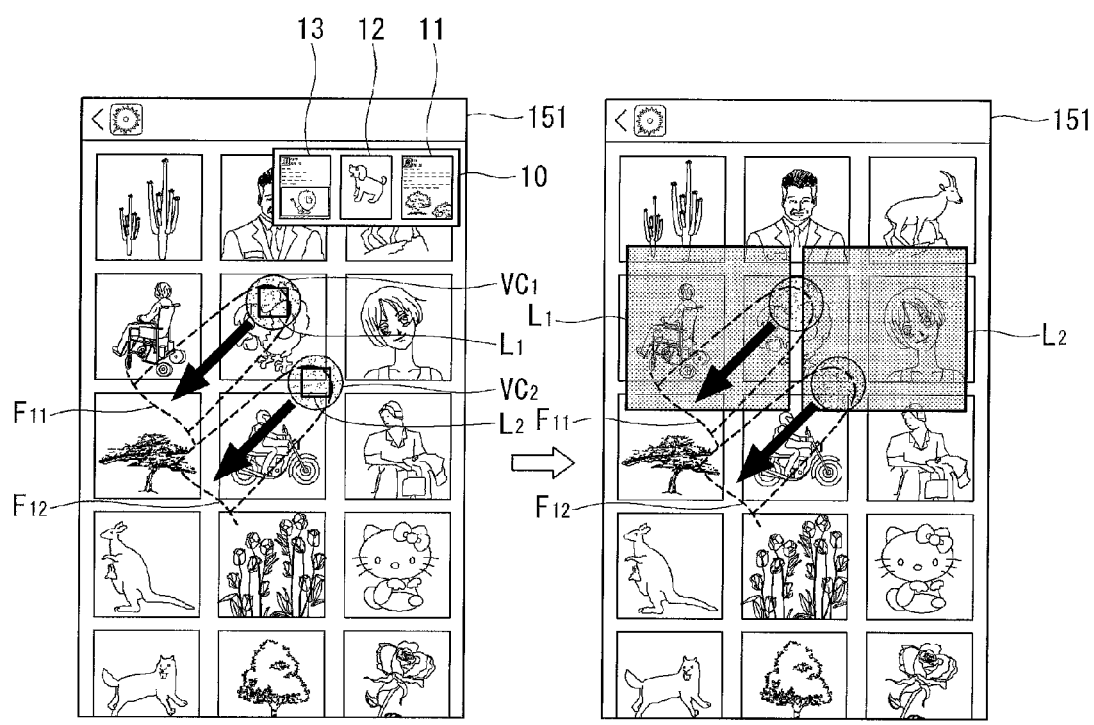
FIGS. 23a, 23b and 23c illustrate an example of modifying and applying the third embodiment of the present invention.
Figure 23B:
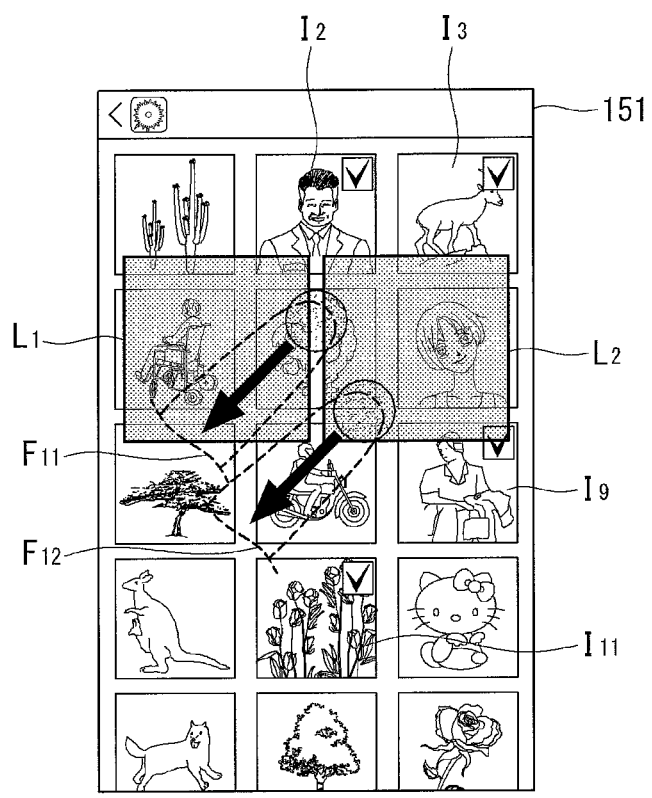
Figure 23C:
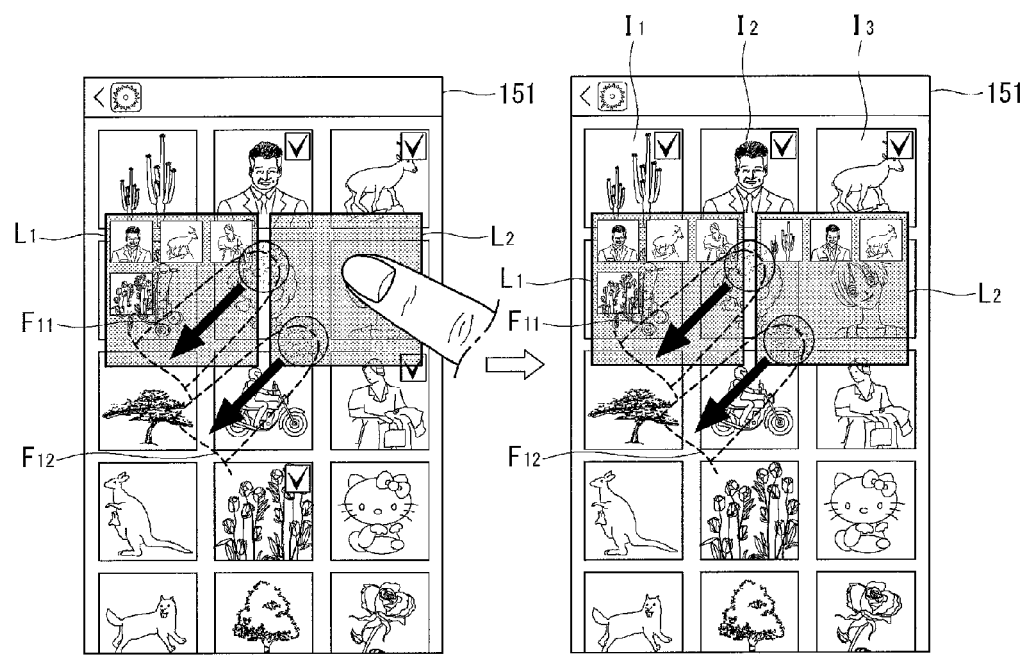

FIGS. 23*a*, 23*b* and 23*c* illustrate examples of modifying and applying the third embodiment of the present invention.

As described above through the first embodiment of the present invention, the rear input VC may correspond to multi-touch input.

Referring to FIG. 23*a*, when the rear input unit (133*a* of FIG. 3) is a touch panel, a first layer L1 may be generated according to first rear input VC1 and a second layer L may be generated when second rear input VC2 is additionally applied after the first rear input VC1.

Accordingly, the first layer L1 and the second layer L2 may be simultaneously displayed on the touchscreen 151.

A description will be given of an example of adding items to the layers L1 and L2 according to the rear input VC in a multi-touch pattern with reference to FIG. 23*b*.

While the first layer L1 and the second layer L2 are simultaneously displayed on the touchscreen 151 and the rear inputs VC1 and VC2 are maintained, input for selecting one of the two layers L1 and L2 may be received.

Then, the controller 180 may activate the selected layer and add an item selected from one or more items displayed on the touchscreen 151 to the activated layer.

Referring to FIG. 23*b*, upon selection of one or more items I2, I3, I9 and I11 from the items displayed on the touchscreen 151 while the first layer L1 is activated, the controller 180 may add the selected items I2, I3, I9 and I11 to the first layer L1.

Referring to FIG. 23*c*, upon reception of input for selecting the second layer L2 while the rear inputs VC1 and VC2 are maintained. The controller 180 may activate the second layer L2. Here, the boundary of the second layer L2 may be highlighted to indicate that the second layer L2 is activated. Otherwise, the second layer L2 may be highlighted in a predetermined color to be discriminated from the first layer L1.

Upon selection of one or more items I1, I2 and I3 from the items displayed on the touchscreen 151 while the second layer L2 is activated, the controller 180 may add the selected items I1, I2 and I3 to the second layer L2.

As described above, the third embodiment of the present invention can generate a basket capable of temporarily storing items displayed on the touchscreen 151 through rear input and store the basket.

The items displayed on the touchscreen 151 may include a content playlist in addition to images.

Figure 24A:
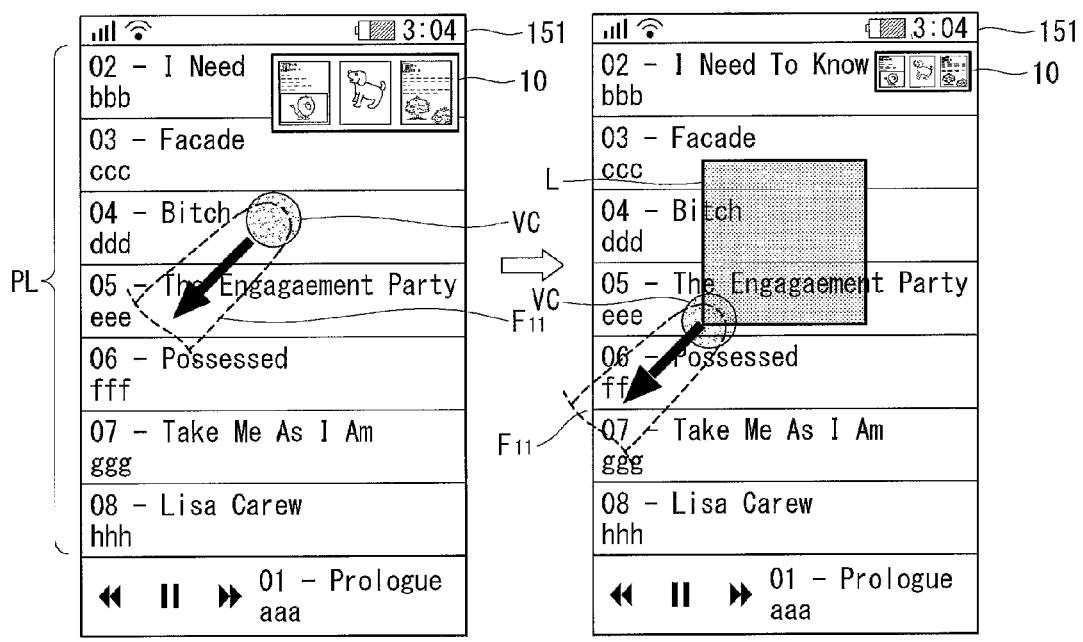
FIGS. 24a and 24b illustrate an example of applying the third embodiment of the present invention to a content list.
Figure 24B:
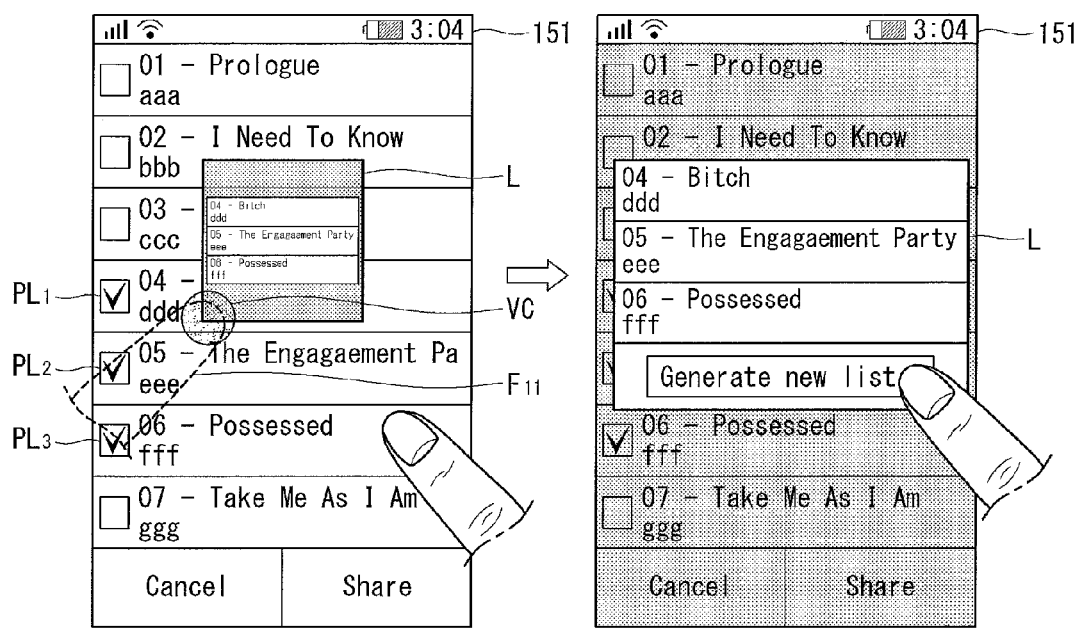

FIGS. 24*a* and 24*b* illustrate an example of applying the third embodiment of the present invention to a content list.

Referring to FIGS. 24*a* and 24*b*, the controller 180 may display a music playlist PL on the touchscreen 151. The controller 180 may display a layer L on the touchscreen 151 upon reception of rear input VC while the music playlist PL is displayed on the touchscreen 151.

The rear input VC may include input of dragging touch input applied to the rear input unit to the first direction. Furthermore, the rear input VC may include zoom-in input according to multi-touch input applied to the rear input unit.

Referring to FIG. 24*b*, upon reception of input for selecting one or more items PL1, PL2 and PL3 while the layer L is displayed on the touchscreen 151, the controller 180 may add the selected items PL1, PL2 and PL3 to the layer L.

When input of dragging the rear input VC to the second direction opposite to the first direction is received, the controller 180 may generate a new playlist PL including the added items PL1, PL2 and PL3.

According to the third embodiment of the present invention, it is possible to achieve effect of generating a new layer on the touchscreen 151 as if a specific point of the touchscreen 151 is opened through rear input. The effect of generating and displaying a layer through rear input according to the third embodiment of the present invention may be modified and implemented in various manners.

Figure 25:
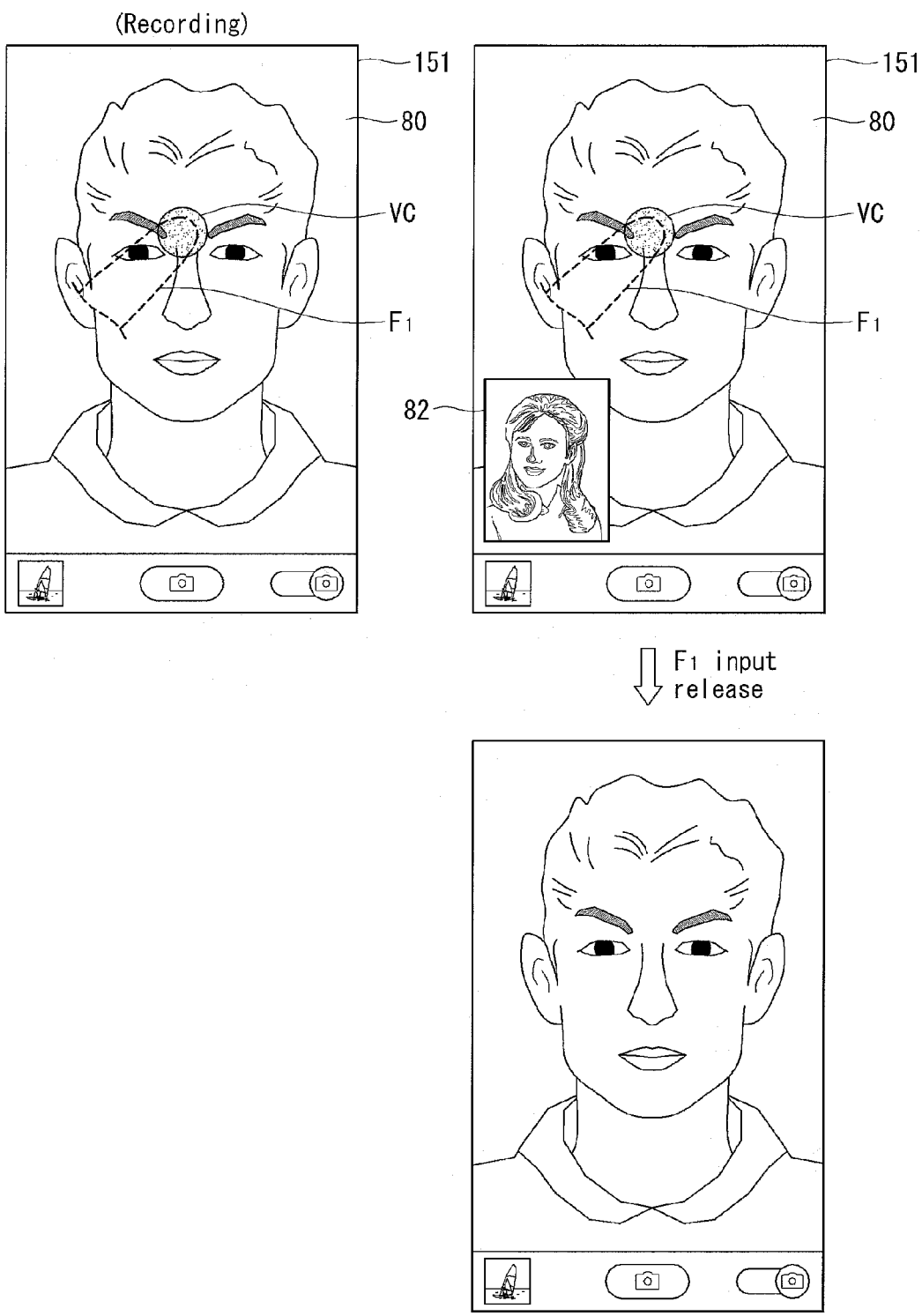
FIG. 25 illustrates a method of controlling an electronic device according to a fourth embodiment of the present invention.

FIG. 25 illustrates a method of controlling an electronic device according to a fourth embodiment of the present invention.

The electronic device 100 according to the fourth embodiment of the present invention can execute a function of capturing an image using dual cameras. The function of capturing an image may include a function of capturing a still image, a function of capturing a moving image, etc.

The controller 180 may drive the camera (rear camera 121' of FIG. 3*b*) to display a first preview image 80 on the touchscreen 151.

Upon reception of rear input VC through the rear input unit (133*a* of FIG. 3*b*) during capture of an image using the rear camera (121' of FIG. 3*b*), the controller 180 may control the front camera (121 of FIG. 2) to operate. The controller 180 may display a second preview image 82 acquired through the front camera (121 of FIG. 2) on the touchscreen 151 such that the second preview image 82 and at least part of the first preview image 80 overlap.

When key input for image capture is received while the first and second preview images 80 and 82 are displayed on the touchscreen 151 and the rear input VC is maintained, the controller 180 may execute a dual image capture function. An image captured by the dual image capture function may be an image composed of the image captured by the rear camera (121' of FIG. 3*b*) and the image captured by the front camera (121 of FIG. 2) which are displayed in an overlapping manner.

Upon release of the rear input VC, the controller 180 may turn off the front camera (121 of FIG. 2) and display only the image according to the rear camera (121' of FIG. 3*b*) on the touchscreen 151.

When the fourth embodiment of the present invention is applied to a process of capturing a moving image, the electronic device 100 may control a video corresponding to only a desired period to be photographed by dual cameras during a video photographing process.

That is, when the rear input VC is maintained for a period from a first point to a second point during video capture through the rear camera, the controller 180 may control only the video corresponding to the period from the first point to the second point to be captured by the dual cameras.

The fourth embodiment of the present invention is applicable to a process of capturing a still image through the rear camera.

While the aforementioned embodiments of the present invention have been respectively performed, the embodiments may be combined with at least part of other embodiments.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. An electronic device, comprising:
a body;
a touchscreen at a first surface of the body;
a rear input unit at a second surface of the body; and
a controller configured to:

receive a first input at the rear input unit while a first page is displayed on the touchscreen, the first page being an application execution screen, store the first page in a standby state in response to the first input, wherein to store the first page in a standby state includes to hold the first page and store attributes of the first page, receive a second input at the touch screen, while the first input at the rear input unit is maintained, execute a function corresponding to the second input while maintaining the standby state of the first page, and display the held first page stored in the standby state on the touchscreen upon release of the first input at the rear input unit.

2. The electronic device of claim 1, wherein in response to the first input at the rear input unit, the controller displays, on the touchscreen, a first thumbnail corresponding to the first page.

3. The electronic device of claim 2, wherein the second input is an input to change the page displayed on the touchscreen, wherein the controller displays a second thumbnail corresponding to a second page along with the first thumbnail on the touchscreen when a predetermined input is received while the second page is displayed on the touchscreen.

4. The electronic device of claim 3, wherein the predetermined input is one of:

an input at a soft key on the touchscreen, an input at a hard key on the body, and a touch input at the rear input unit when the rear input unit is a touch panel, the touch input being discriminated from the first input.

5. The electronic device of claim 2, wherein in response to release of the first input at the rear input unit, the controller removes the first thumbnail displayed on the touchscreen.

6. The electronic device of claim 1, wherein when a plurality of pages are stored in the standby state, the controller displays, on a thumbnail tray on the touchscreen, a plurality of thumbnails respectively corresponding to the plurality of pages.

7. The electronic device of claim 6, wherein the controller controls display of a page corresponding to a thumbnail on the thumbnail tray based on a touch pattern applied at the thumbnail.

8. The electronic device of claim 1, wherein the first page is an execution screen of an application to reproduce a webpage or to edit an image.

9. The electronic device of claim 1, wherein the second input is a drag input applied to a submenu corresponding to the first page, wherein in response to the drag input while maintaining display of the first page, the controller displays a slidable layer, and the controller displays information related to the submenu on the slidable layer.

10. The electronic device of claim 1, wherein the second input is a predetermined input with respect to one of a plurality of components of the first page, wherein the controller separates a selected component from the first page and displays the separated component as a movable floating window.

11. The electronic device of claim 1, wherein the first input includes a touch-and-drag input at the rear input unit, wherein in response to the first input, a back portion of the first page is displayed on the touchscreen, and the displayed back portion of the first page to receive a handwriting input.

12. The electronic device of claim 1, wherein the first page includes a preview image captured by a camera, and the second input includes an input to capture an image, and wherein in response to the second input, the controller displays, on the preview image, a thumbnail corresponding to a captured image.

13. The electronic device of claim 1, wherein the controller configured to display an indicator on the touchscreen to indicate the receiving of the first input at the rear input unit.

14. An electronic device, comprising:

a body a touchscreen at a first surface of the body;

a rear input unit at a second surface of the body; and a controller configured to:

receive a first input at the rear input unit while a page having at least one item is displayed on the touchscreen, store the page in a standby state in response to the first input, wherein to store the page in a standby state includes to hold the page and store attributes of the page, display, on the touchscreen, a layer having a size that varies according to the first input while the page having at least one item is displayed on the touchscreen, receive a second input to select at least one item while maintaining the first input, while the first input at the rear unit is maintained, and display, in response to the second input, the selected at least one item on the displayed layer.

15. The electronic device of claim 14, wherein in response to release of the first input, the controller generates a layer including the selected item and displays the layer on the touchscreen.

16. The electronic device of claim 14, wherein the rear input unit includes a touch panel, and the first input includes a multi-touch input at the touch panel, wherein the controller displays a plurality of layers respectively corresponding to the multi-touch input on the touchscreen.

17. A method of controlling an electronic device, comprising:

displaying a first page on a touchscreen at a first surface of a body of the electronic device, the first page being an application execution screen;

receiving a first input at a rear input unit at a second surface of the body;

storing, in response to the first input, the first page in a standby state, wherein storing the first page in a standby state includes holding the first page and storing attributes of the first page;

receiving a second input at the touchscreen while maintaining the standby state, while the first input at the rear input unit is maintained;

executing a function corresponding to the second input; and displaying the first page in the standby state on the touchscreen upon release of the first input.

18. The method of claim 17, wherein the first page is one of a webpage, a preview image according to execution of a camera application, an image editing screen, at least one image and a content playlist.

19. The method of claim 17, wherein the first input is one of a touch input at the rear input unit, a touch-and-drag input and a multi-touch input.

20. The method of claim 17, further comprising displaying a first thumbnail corresponding to the first page on the touchscreen.

* * * * *